(12) United States Patent
Lee

(10) Patent No.: US 9,444,280 B2
(45) Date of Patent: Sep. 13, 2016

(54) UNINTERRUPTABLE POWER SUPPLY SYSTEM AND METHOD

(71) Applicant: LITE-ON, INC., Milpitas, CA (US)

(72) Inventor: Victor K. J. Lee, Dallas, TX (US)

(73) Assignee: LITE-ON, INC., Milpitas, CA (US)

( * ) Notice: Subject to any disclaimer, the term of this patent is extended or adjusted under 35 U.S.C. 154(b) by 0 days.

(21) Appl. No.: 14/843,880

(22) Filed: Sep. 2, 2015

(65) Prior Publication Data

US 2015/0380968 A1    Dec. 31, 2015

Related U.S. Application Data

(63) Continuation of application No. 14/565,754, filed on Dec. 10, 2014, which is a continuation-in-part of application No. 14/509,454, filed on Oct. 8, 2014, now Pat. No. 9,047,075, which is a continuation of (Continued)

(51) Int. Cl.
| | |
|---|---|
| *H02J 7/00* | (2006.01) |
| *H02J 9/06* | (2006.01) |
| *H02M 7/44* | (2006.01) |
| *G06F 1/30* | (2006.01) |

(52) U.S. Cl.
CPC ............ *H02J 7/0068* (2013.01); *G06F 1/30* (2013.01); *H02J 9/06* (2013.01); *H02J 9/061* (2013.01); *H02M 7/44* (2013.01)

(58) Field of Classification Search
None
See application file for complete search history.

(56) References Cited

U.S. PATENT DOCUMENTS

| | | |
|---|---|---|
| 9,047,075 B1 | 6/2015 | Lee |
| 9,047,076 B1 | 6/2015 | Lee |

(Continued)

FOREIGN PATENT DOCUMENTS

| | | |
|---|---|---|
| DE | 3031981 A1 | 4/1982 |
| DE | 10200802422 A1 | 2/2009 |

(Continued)

OTHER PUBLICATIONS

EPO, European Search Report for EP1419244 dated Jul. 10, 2015.

(Continued)

*Primary Examiner* — Kim Huynh
*Assistant Examiner* — Vincent Chang
(74) *Attorney, Agent, or Firm* — David W. Carstens; Kevin M. Klughart; Carstens & Cahoon, LLP

(57) ABSTRACT

An uninterruptable power supply (UPS) system/method providing power line conditioning and power factor correction (PFC) that incorporates centralized battery backup energy storage architecture is disclosed. The system generally comprises an AC-DC power supply with active PFC (power factor correction) function, a battery transfer switch, an isolated battery charger placed between the utility power source and battery strings, battery strings connecting the battery charger and the battery transfer switch, EMI/Lightning circuitry that provides lighting/line surge protection as well noise suppression functions, and a controller monitoring the quality of the utility power source. Uninterruptable power for data centers is achieved in this context via use of the battery strings, battery transfer switch, battery charger, and controller system configuration. Disclosed methods associated with this system generally permit the UPS to operate in a distributed fashion in support of computing systems within data centers.

30 Claims, 32 Drawing Sheets

Related U.S. Application Data application No. 14/461,110, filed on Aug. 15, 2014, now Pat. No. 9,047,076.

(60) Provisional application No. 61/922,311, filed on Dec. 31, 2013.

(56) References Cited

U.S. PATENT DOCUMENTS

| | | |
|---|---|---|
| 2004/0164618 A1 | 8/2004 | Bryde |
| 2006/0050465 A1 | 3/2006 | Cho et al. |
| 2010/0180139 A1* | 7/2010 | Denney .................. G06F 1/30 |
| | | 713/330 |
| 2011/0291606 A1 | 12/2011 | Lee |
| 2012/0081078 A1* | 4/2012 | Matsumura ............... H02J 7/02 |
| | | 320/134 |
| 2012/0086269 A1 | 4/2012 | Nakano et al. |
| 2013/0020872 A1 | 1/2013 | Kinnard |
| 2013/0141828 A1* | 6/2013 | Yamaguchi ........... H01M 10/44 |
| | | 361/86 |
| 2013/0246815 A1 | 9/2013 | Uehara |

FOREIGN PATENT DOCUMENTS

| | | |
|---|---|---|
| EP | 2833504 A1 | 2/2015 |
| KR | 101322617 B1 | 10/2013 |

OTHER PUBLICATIONS

EPO, European Search Report for EP14199267 dated May 7, 2015.

* cited by examiner

FIG. 32
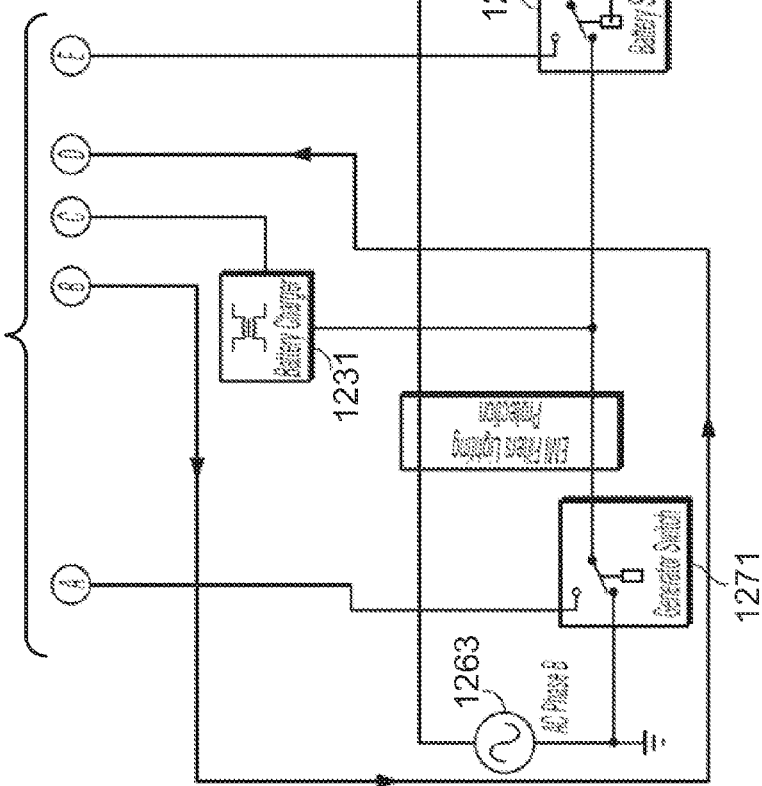
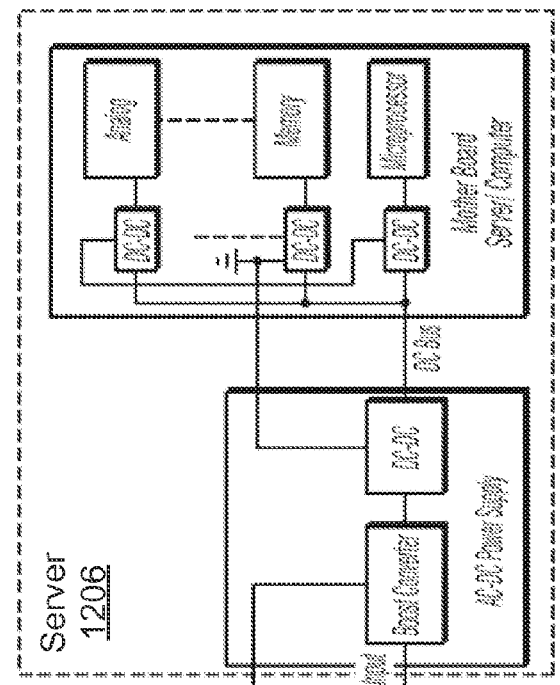

UNINTERRUPTABLE POWER SUPPLY SYSTEM AND METHOD

CROSS REFERENCE TO RELATED APPLICATIONS

Continuation Patent Application (CPA)

This is a continuation patent application (CPA) of and incorporates by reference United States Utility patent application for POWER SUPPLY CONFIGURATION SYSTEM AND METHOD by inventor Victor K. J. Lee, filed electronically with the USPTO on Dec. 10, 2014, with Ser. No. 14/565,754, EFSID 20919171, confirmation number 2974.

Continuation Patent Applications (CIP)

United States Utility patent application for POWER SUPPLY CONFIGURATION SYSTEM AND METHOD by inventor Victor K. J. Lee, filed electronically with the USPTO on Dec. 10, 2014, with Ser. No. 14/565,754, is a continuation-in-part (CIP) patent application of and incorporates by reference United States Utility patent application for UNINTERRUPTABLE POWER SUPPLY SYSTEM AND METHOD by inventor Victor K. J. Lee, filed electronically with the USPTO on Aug. 15, 2014, with Ser. No. 14/461,110, EFSID 19882156, confirmation number 3198, now U.S. Pat. No. 9,047,076.

United States Utility patent application for UNINTERRUPTABLE POWER SUPPLY SYSTEM AND METHOD by inventor Victor K. J. Lee, filed electronically with the USPTO on Dec. 10, 2014, with Ser. No. 14/565,754, is a continuation-in-part (CIP) patent application of and incorporates by reference United States Utility patent application for UNINTERRUPTABLE POWER SUPPLY SYSTEM AND METHOD by inventor Victor K. J. Lee, filed electronically with the USPTO on Oct. 8, 2014, with Ser. No. 14/509,454, EFSID 20358607, confirmation number 3152, now U.S. Pat. No. 9,047,075.

Continuation Patent Application (CPA)

United States Utility patent application for UNINTERRUPTABLE POWER SUPPLY SYSTEM AND METHOD by inventor Victor K. J. Lee, filed electronically with the USPTO on Oct. 8, 2014, with Ser. No. 14/509,454, is a continuation patent application (CPA) of and incorporates by reference United States Utility patent application for UNINTERRUPTABLE POWER SUPPLY SYSTEM AND METHOD by inventor Victor K. J. Lee, filed electronically with the USPTO on Aug. 15, 2014, with Ser. No. 14/461,110, 19882156, confirmation number 3198, now U.S. Pat. No. 9,047,076.

Provisional Patent Application

United States Utility patent application for UNINTERRUPTABLE POWER SUPPLY SYSTEM AND METHOD by inventor Victor K. J. Lee, filed electronically with the USPTO on Aug. 15, 2014, with Ser. No. 14/461,110, 19882156, confirmation number 3198, now U.S. Pat. No. 9,047,076, claims benefit under 35 U.S.C. §119 and incorporates by reference United States Provisional patent application for UNINTERRUPTABLE POWER SUPPLY SYSTEM AND METHOD by inventor Victor K. J. Lee, filed electronically with the USPTO on Dec. 31, 2013, with Ser. No. 61/922,311, EFS ID 17788637, confirmation number 8260.

PARTIAL WAIVER OF COPYRIGHT

All of the material in this patent application is subject to copyright protection under the copyright laws of the United States and of other countries. As of the first effective filing date of the present application, this material is protected as unpublished material.

However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO A MICROFICHE APPENDIX

Not Applicable

PRIOR ART AND BACKGROUND OF THE INVENTION

1. Field of the Invention

The present invention generally relates to systems and methods associated with uninterruptable power supplies (UPS). Specifically, the present invention relates in some preferred embodiments to UPS systems/method as applied to large computing data centers.

2. Prior Art Background

In recent years, Internet traffic has grown exponentially due to the huge demand for voice, data and video applications. To process this intensive amount of data traffic and storage, novel concepts such as "Cloud Computing" and "large data centers" emerge. These concepts ensure that users share the entire infrastructure cost of data thus reducing the individual user's expense. Other novel concepts such as "meter computing" and "pay as you go" have also materialized that allow users access to computing resources but do not require the user to pay for idle computing resources.

Shared services, applications, platforms, etc., lead to the demand for "large or mega data centers" with shared IT infrastructures. Any large/mega data center should address the issues of cost, flexibility, scalability, efficiency, utilization, redundancy, and management in order to support "Cloud Computing" applications. As the demand for large data center increases, modular/container data center architectures begin to evolve. One fundamental development is the distributed concept which utilizes modular/containerized data centers that comprise factory-built modules that processes and store data within a modular infrastructure. These modular solutions require the best ideas for design, reliability, and efficiency of prefabricated, repeatable and operationally optimized modules. The modular/containerized data center approach can provide standardization, lower cost, scalability, flexibility, and speed for constructing/expanding a large data center. A typical modular/containerized data center contains a UPS (uninterruptable power supply), server racks, cooling, and IT equipment, etc.).

An Uninterruptible Power Supply (UPS) is an electrical apparatus that provides emergency power to a critical load such as data centers when an input power source (typically utility (main) power) fails. A UPS differs from emergency power systems (flywheel, fuel cells, generators, etc.) or a standby generator in that it will provide near-instantaneous protection from "input power line interruption" by supplying energy stored in batteries or a flywheel. The backup time is usually relatively short (only a few minutes to tenth of minutes), but sufficient to start a standby power source or properly shutdown the protected load and store its critical data. A UPS is typically used to protect data centers, computers, and/or telecommunication equipment when an unexpected power disruption could cause serious business disruption or data losses.

Standards for Withstanding Power Line Disturbances (0100)

"Input Power Interruption" includes line voltage sag/under-voltage, waveform distortion, line harmonics, swell/over voltage, etc. IT equipment uses AC electricity to power processing circuits (e.g. servers), and it is absolutely critical that power interruptions not interfere with their functions. Therefore, data center design must encapsulate the UPS (uninterrupted power supply) architecture to prevent "power line interruptions" from impacting IT equipment operations. Standards for this behavior have been published by the Computer Business Manufactures Association (CBEMA)

FIG. 1 (0100) depicts the prior art CBEMA curve that was developed by the Computer Business Manufactures Association in the 1970s, and is a design requirement for the power supply design to withstand power line disturbances. The CBEMA curve was derived from experimental and historical data taken from mainframe computers. The best scientific interpretation of the curve can be given in terms of a voltage standard applied to the DC bus voltage of a rectifier load.

The CBEMA curve is a susceptibility profile with the abscissa (horizontal axis) representing the duration of the event, while the ordinate (vertical axis) indicates the percent of voltage applied to the power circuit. In the center of the plot is the so called acceptable area. Voltage values above the envelope are supposed to cause malfunctions such as insulation failure, overexcitation and overvoltage trip. On the other hand, voltages below the envelope are assumed to cause the load to drop out due to lack of energy. In other words, the concept is that if the supply voltage stays within the acceptable power area then the sensitive equipment will operate well. However, if such an event persists for a longer time, then the sensitive equipment might fail.

To elaborate, the CBEMA curve shows that voltage transients of certain magnitudes, say about 200%, are acceptable for short periods of time—1 millisecond. Yet, that same transient with a duration of ½ cycle or 8.333 milliseconds would already cause malfunctions (i.e. disruption of data). Also, the CBEMA curve illustrates that voltage levels below nominal are acceptable, provided that they do not drop below the magnitude and duration indicated by the curve. Thus, a decrease in nominal voltage by 30% for ½ cycle would not cause disruption of data. Moreover, the CBEMA curve shows that voltage levels of even zero can be tolerated for a very brief period of time—4.167 milliseconds or ¼ cycle. However, losing voltage for only a little more than ¼ cycle for a computer and/or other extremely sensitive equipment would already cause unwanted disruption.

In short, computers, programmable logic controllers (PLCs), power distribution units (PDUs), instrumentation, telecom and other solid-state systems will operate reliably when applied properly. Nonetheless, all these units are voltage and time sensitive, which means that voltage sags and swells, as well as interruptions and transients will critically affect their operation.

Furthermore, balanced voltage sag events in three phase systems can be treated effectively as a single phase equivalent. The CBEMA curve is originally utilized to address this case. Yet, most voltage sags are unbalanced, just like the phase-to-ground fault (most common type of fault) in which only one of the phase voltages is depressed. All the highlighted causes of voltage sag events will have to be considered if one is to develop a meaningful power acceptability curve for three phase systems. However, developing a single power acceptability curve to capture all these possible scenarios is nearly impractical. The recommended approach is to model several fault types in conjunction with a dynamic load model to obtain a power acceptability curve.

In using the CBEMA curve, one must first determine the nature of the power quality disturbances that are most prevalent in a facility. Power quality phenomena associated with powering, grounding, and protecting solid-state devices can be measured, analyzed, and evaluated using test equipment specifically intended for digital logic systems. These instruments, when located near the suspected disturbance, or when measuring the unusual operation of the power distribution system, will provide data on voltage variations and fluctuations and the specifics on how the power quality problem places the equipment at risk. The measurements and results can then be analyzed in combination with the CBEMA curve to help understand the nature of power quality disturbances.

The CBEMA curve of FIG. 1 (0100) depicts minimum power disturbance tolerance in single-phase IT equipment power supplies. The CBEMA curve depicted in FIG. 1 (0100) is one of the most frequently used standards for measuring power disturbance immunity for a power supply. The present invention power supply designs discussed herein will typically be designed to meet these CBEMA requirements.

Conventional UPS Design Architecture (0200)

Current UPS energy backup architectures for large data centers use an on-line/double-conversion UPS as generally depicted in FIG. 2 (0200). This method accepts AC input (0210), rectifying (0220) to DC for passing through (and/or recharging (0230)) the rechargeable battery (or battery strings) (0240), then inverting back to 120V/230V AC (0250) for powering the protected equipment (0260). The drawbacks of this double conversion system are high capital cost, low efficiency, low scalability, difficulty of repair, high component counts, high maintenance, and high operation cost. This prior art approach is not an optimal solution for current mega/larger data centers incorporating distributed modular/containerized architectures.

BRIEF SUMMARY OF THE INVENTION

The present invention addresses the above-mentioned problems of by implementing a UPS system with low capital cost, high efficiency, high scalability, low component counts, easily optimized battery storage capacity, low maintenance, and low operation that is needed for mega/large data centers while preserving all the double-conversion UPS features for backup of critical loads within data centers. Most important, the present invention blends flawlessly with existing modular/container data center architectures for cloud computing. These advantages are achieved by eliminating the DC-AC converter stage within the prior art and replacing it with an AC+DC power supply capable of delivering semi-regulated DC power to on-board regulators within the protected equipment. This architecture simplifies switching of power for normal to standby sources and eliminates much of the hardware overhead associated and efficiencies associated with the prior art.

The present invention provides for three major functions as described below.

Power Conditioning

The AC-DC power supply is designed to protect against "power line disturbance" (meeting CBEMA curve requirement as described in FIG. 1 (0100)) and "AC waveform distortions" (power line harmonics, voltage fluctuation, AC power frequency variations). The EMI/Lightning circuitry provides lightning/line surge protection as well noise suppression functions.

Power line disturbance impacts IT load normal operations. In recent years, IT manufacturers require that AC-DC power supplies which power their processing needs meet power interruption requirements such as EN 61000-3-2 and IEC 62040-3 for a short turn power line disturbance. Similarly, an application note commonly referred to throughout the industry as the CBEMA curve (FIG. 1 (0100)), originally developed by the Computer and Business Manufacturers Association, illustrates a performance curve of minimal tolerance of power disturbance in single-phase IT equipment power supply.

Uninterrupted Power

The battery strings, battery transfer switch, isolated battery charger, and controller serve the "uninterrupted" power supply function. During AC failure, the battery transfer switch will connect to DC battery strings per controller commands to provide power continuity to the IT load.

Centralized Battery

The system centralizes battery storage in redundancy or multi-system applications. A central battery architecture can provide the same energy storage requirement as a distributed battery system while significantly reducing the battery count.

Advantages

The present invention has the following advantages compared to on-line/double-conversion UPS architecture:
- Efficiency: The present invention removes the traditional centralized double-conversion UPS stage and can improve overall system efficiency by 3-6%.
- Battery: By applying centralized battery architecture as detailed within the present invention, the battery count is reduced by 20-40% as compared to distributed battery architectures.
- Flexibility/Scalability: The present invention includes a modularized, standard distributed system, which is readily and easily expandable.
- Maintenance: The present invention is easy to maintain and the time to repair/maintain the system is shorter than conventional UPS architectures.
- Lower Cost: Overall system cost is reduced by removing the cost of the double conversion UPS power stage.
- Space: The present invention occupies much less space (because the system does not have double conversion UPS), and can easily add/remove power capacity.

One skilled in the art will recognize that these advantages are exemplary and dependent on application context.

BRIEF DESCRIPTION OF THE DRAWINGS

For a fuller understanding of the advantages provided by the invention, reference should be made to the following detailed description together with the accompanying drawings wherein:

FIG. 31 and FIG. 32 illustrate the power path and show how backup battery and generator work in the 1+1 redundancy configuration of FIG. 29-30 when the system loses one of its AC power sources.

DESCRIPTION OF THE PRESENTLY PREFERRED EXEMPLARY EMBODIMENTS

Figure 1:
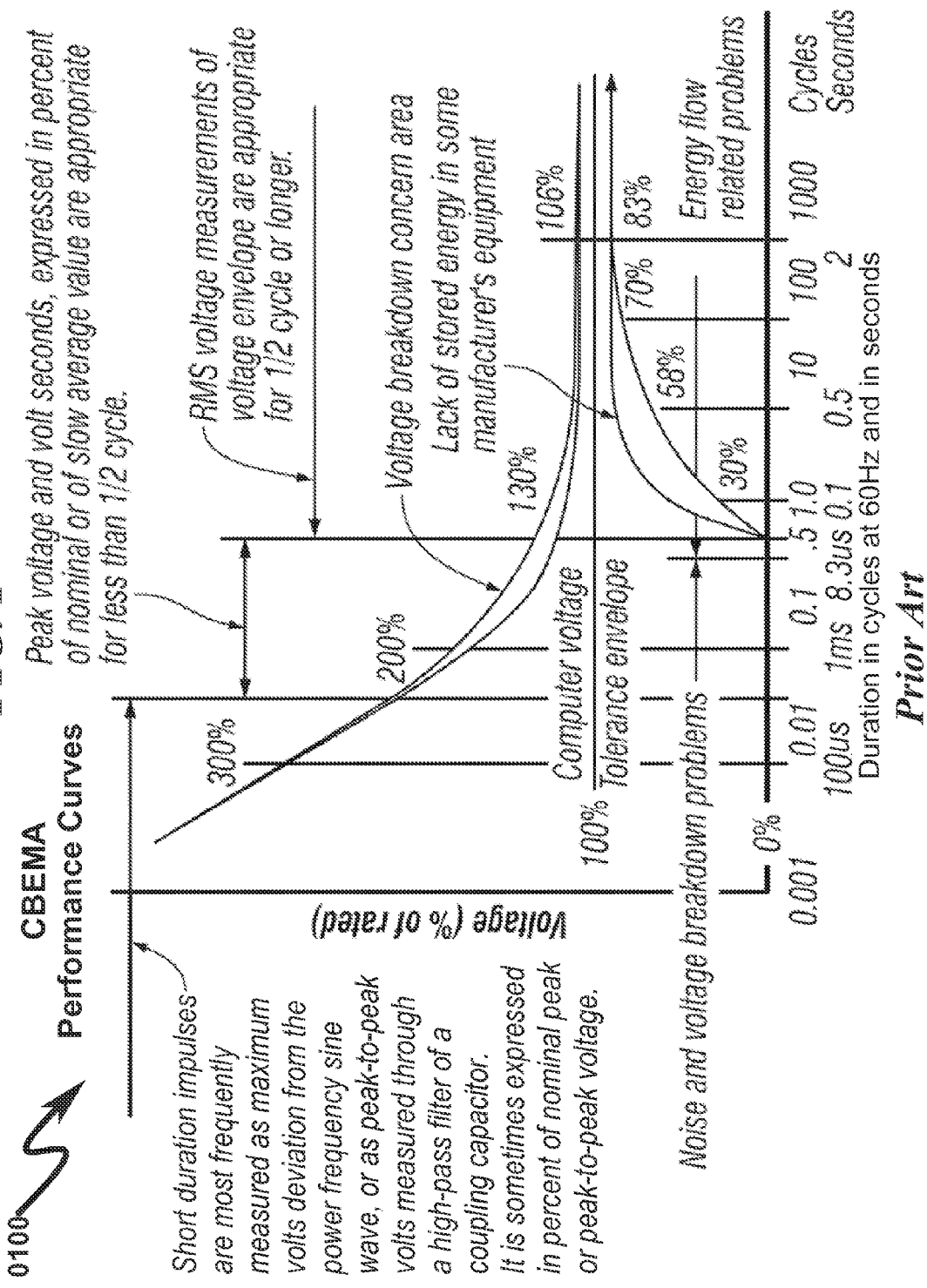
FIG. 1 illustrates a graph depicting prior art Computer and Business Manufacturers Association (CBEMA) information on power outages associated with the information technology (IT) industry. This CBEMA curve depicts performance curves of minimal tolerance of power disturbance in single-phase IT equipment power supplies. This CBEMA curve is one of the most frequently employed power capability curves. It was developed by Computer Business Manufactures Association in the 1970s as a guideline for organization members to design their power supplies. It is the goal of the present invention to meet the requirements of this CBEMA curve.

While this invention is susceptible to embodiment in many different forms, there is shown in the drawings and will herein be described in detailed preferred embodiments of the invention with the understanding that the present disclosure is to be considered as an exemplification of the principles of the invention and is not intended to limit the broad aspect of the invention to the embodiment illustrated.

The numerous innovative teachings of the present application will be described with particular reference to the presently preferred embodiment, wherein these innovative teachings are advantageously applied to the particular problems of an UNINTERRUPTABLE POWER SUPPLY SYSTEM AND METHOD. However, it should be understood that this embodiment is only one example of the many advantageous uses of the innovative teachings herein. In general, statements made in the specification of the present application do not necessarily limit any of the various claimed inventions. Moreover, some statements may apply to some inventive features but not to others.

Switch Methodology Not Limitive

The present invention will be discussed in the context of a variety of boost converter topologies, some of which are preferred depending on application context. These converter topologies will be shown to incorporate MOSFET electrical switches, but the present invention is not limited in scope to the use of these devices and may incorporate any form of electrical switch, such as (but not limited to) bipolar transistors, MOSFETs, IGBTs, etc.

Control System Not Limitive

The present invention may utilize a wide variety of constructs when implementing the power controller described herein. Many preferred invention embodiments may utilize a computerized control mechanism wherein the computer system executes machine instructions read from a tangible, non-transitory, computer readable medium.

System Overview (0300)

Figure 3:
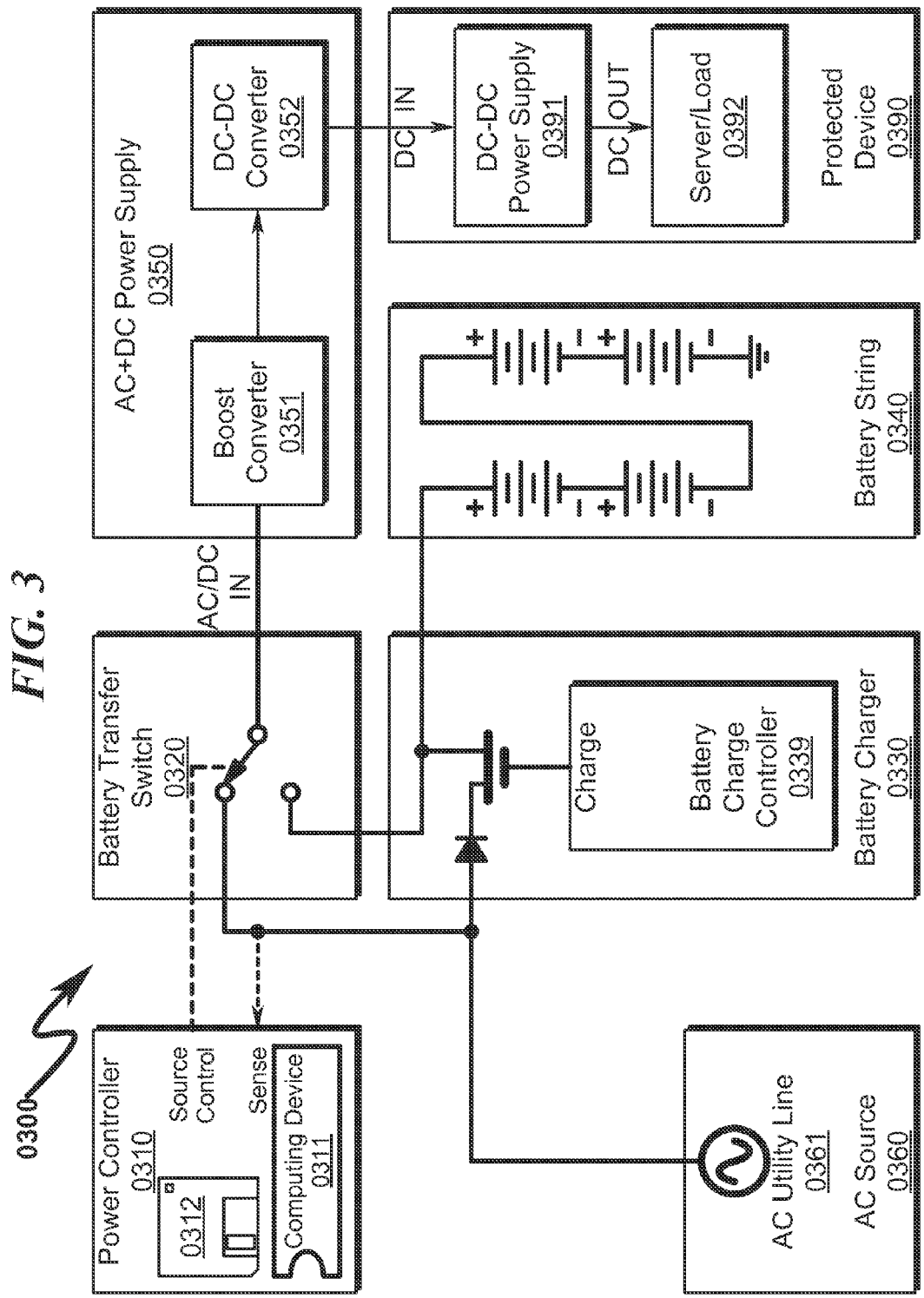
FIG. 3 illustrates a block diagram depicting a preferred exemplary system embodiment of the present invention.

A preferred exemplary system embodiment of the present invention is depicted in FIG. 3 (0300). In this application context, the protected device (0390) that is served by the UPS system comprises a combination of DC-DC power supply (0391) that provides power to a computer server/load (0392) or some other load. The UPS system incorporates a power controller (0310) that may incorporate a computing device (0311) (such as a microprocessor, microcontroller, digital logic, or other form of digital computer) executing machine instructions read from a computer readable medium (0312). This power controller (0310) serves to coordinate the operation of a battery transfer switch (0320), battery charger (0330), battery string (0340), and AC+DC power supply (0350) as served by an AC power source (0360).

In normal operation, the power controller (0310) senses the state of the AC power source (0360) (which is typically an AC utility provider) and configures the battery transfer switch (0320) to supply AC power to the AC+DC power supply (0350). The AC+DC power supply (0350) is configured to accept either AC input or DC high voltage input (100V-240V) and process this input with a boost converter (0351) that then supplies DC to a DC-DC converter that supports a lower DC voltage input (10V-24V) to the protected device (0390). The DC-DC converters (0391) within the protected device (0390) then convert this lower DC input voltage to required DC voltages needed within the server/load (0392).

Under normal conditions with stable AC source (0360) input, the battery charger (0330) ensures that a battery string (0340) is properly maintained at a full charge level. This battery string (0330) is configured to provide a DC voltage comparable to that of the AC source (0360) and thus permit efficient charging via a battery charge controller (0339) contained within the battery charger (0330).

When the AC source (0360) fails for any reason, the power controller (0310) detects this voltage failure and switches the battery transfer switch (0320) from the AC source (0360) to the battery string (0340) and thus supplies the AC+DC power supply (0350) with DC during this power fail condition. Note that in this circumstance the detected power failure in the AC source (0360) may be minor in nature, such as the detection of a transient or brownout condition or some other anomaly in which the AC source (0360) is still providing power but not at acceptable quality levels. Note in these circumstances that the battery charger (0330) may still be configured to charge the battery string (0340) with whatever power is available from the AC source (0360), but the power supplied to the AC+DC power supply is derived primarily from the battery string (0340) and not the AC source (0360).

Figure 2:
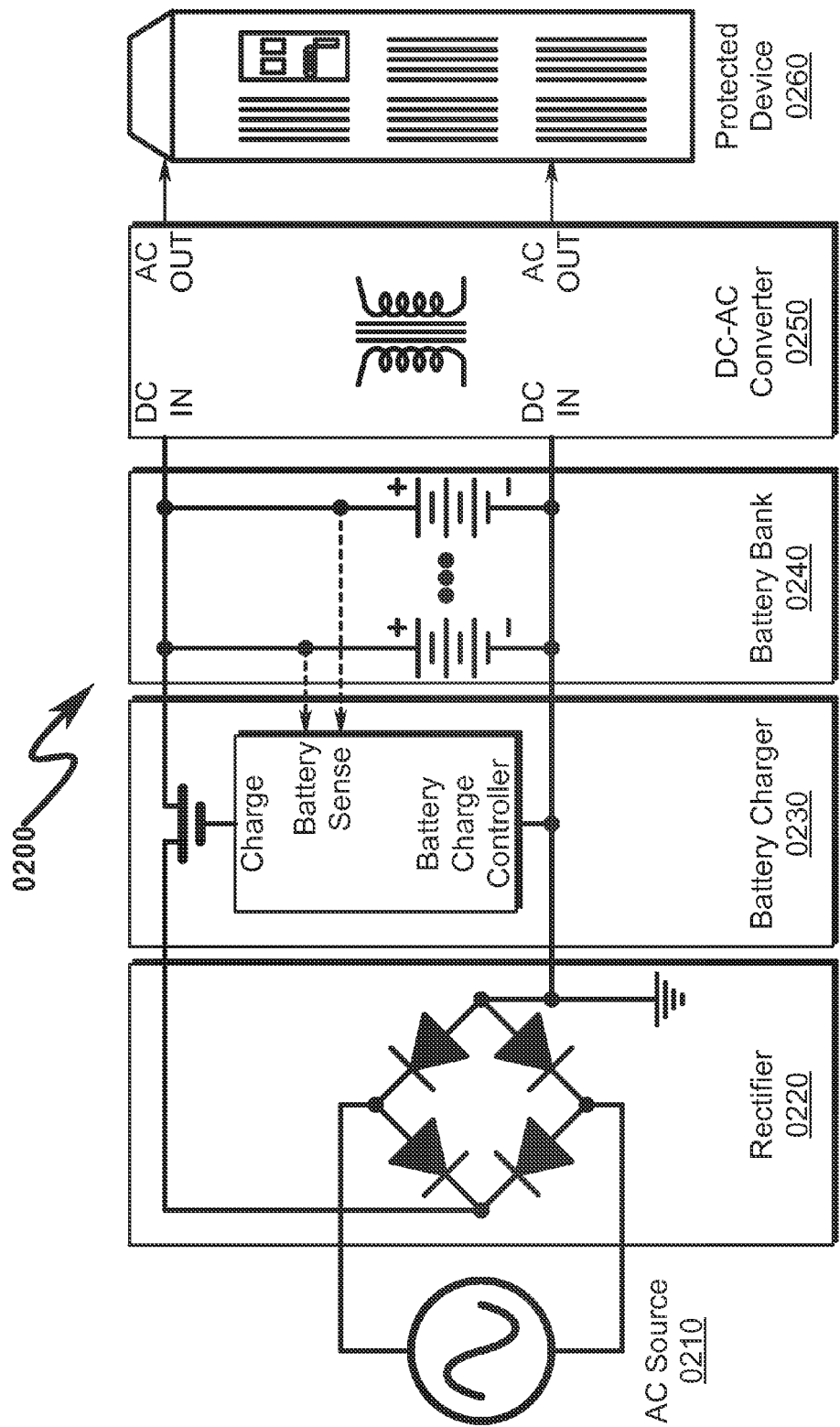
FIG. 2 illustrates a system block diagram depicting prior art uninterruptable power supply (UPS) components and architecture.

This architecture eliminates the need for a DC-to-AC conversion associated with the prior art battery backup scenarios, thus simplifying the implementation of the battery charger (0330), battery string (0340), and AC+DC power supply (0350). Note also that the higher voltages associated with the battery string (0340) as compared to the battery bank (FIG. 2 (0240)) mean that the charging of the battery string (0340) is more efficient than that of the prior art as less current is needed (at a higher voltage) to charge a series string of batteries (0340) than a parallel battery bank configuration (FIG. 2 (0240)), thus minimizing the hardware complement to achieve this function. Furthermore, the use of a boost converter (0351) within the AC+DC power supply (0350) permits instantaneous switching from the AC source (0360) to the battery string (0340) during a power source failover condition. The higher battery string (0340) voltage also permits greater efficiency in the AC+DC power supply (0350) as compared to higher current DC-to-AC converters as used in the prior art.

Method Overview (0400)

Figure 4:
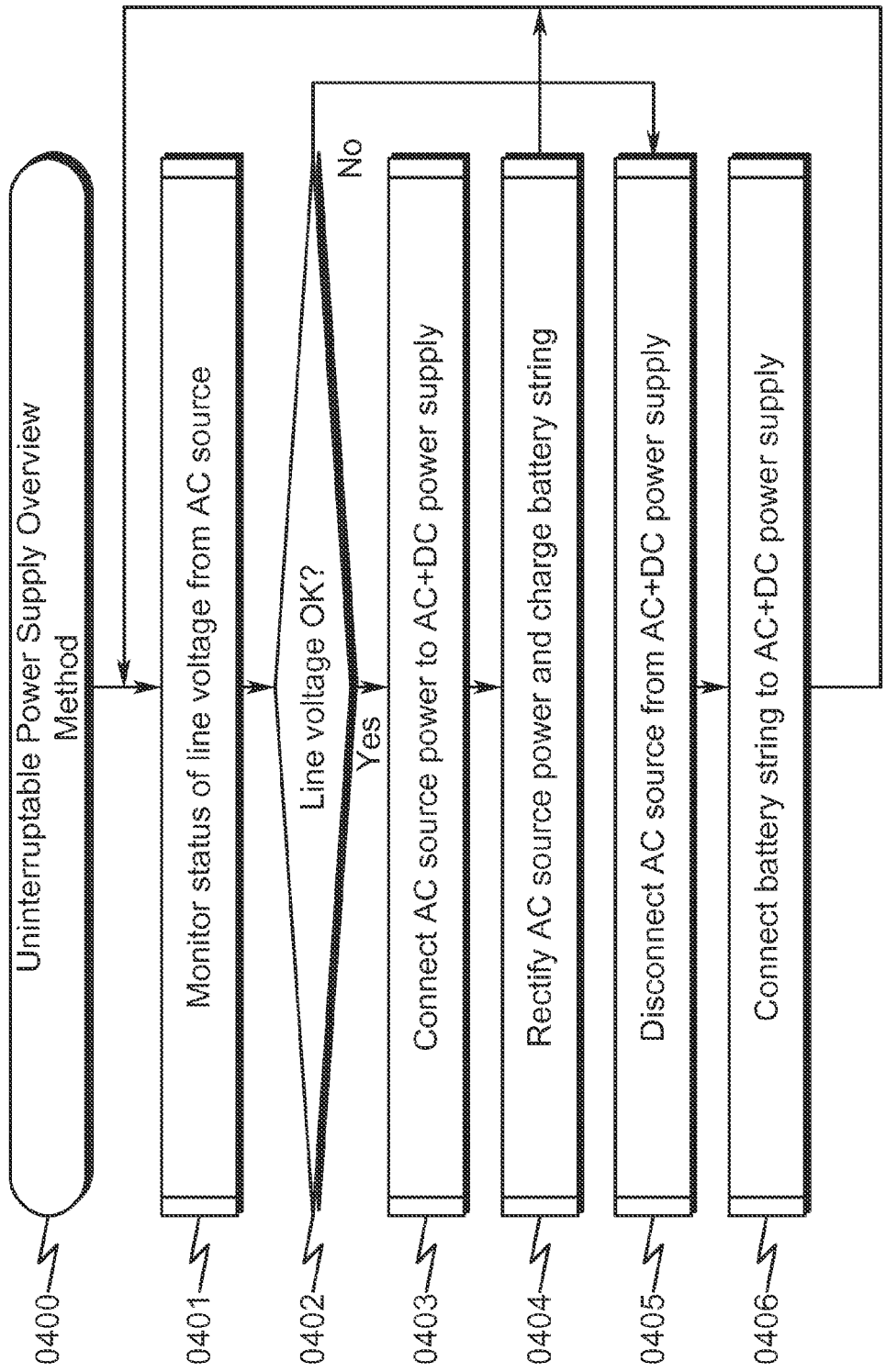
FIG. 4 illustrates a flowchart depicting a preferred exemplary method embodiment of the present invention.

The system context as depicted in FIG. 3 (0300) is typically associated with an overall methodology as depicted in FIG. 4 (0400) and involves the following steps:
(1) With a power controller, monitoring the status of line voltage from an AC source (0401);
(2) Determining if the AC source voltage is within predetermined limits and quality, and if not, proceeding to step (5) (0402);
(3) Connect the AC source power to a AC+DC power supply (0403);
(4) Rectify AC source power and charge battery string and proceed to step (1) (0404);
(5) Disconnect the AC source from the AC+DC power supply (0405); and
(6) Connect battery string to AC+DC power supply and proceed to step (1) (0406).

One skilled in the art will recognize that these method steps may be augmented or rearranged without limiting the teachings of the present invention. This general method overview may be augmented by the various elements described herein to produce a wide variety of invention embodiments consistent with this overall design description.

Alternate System Overview—AC Sources (0500)

Figure 5:
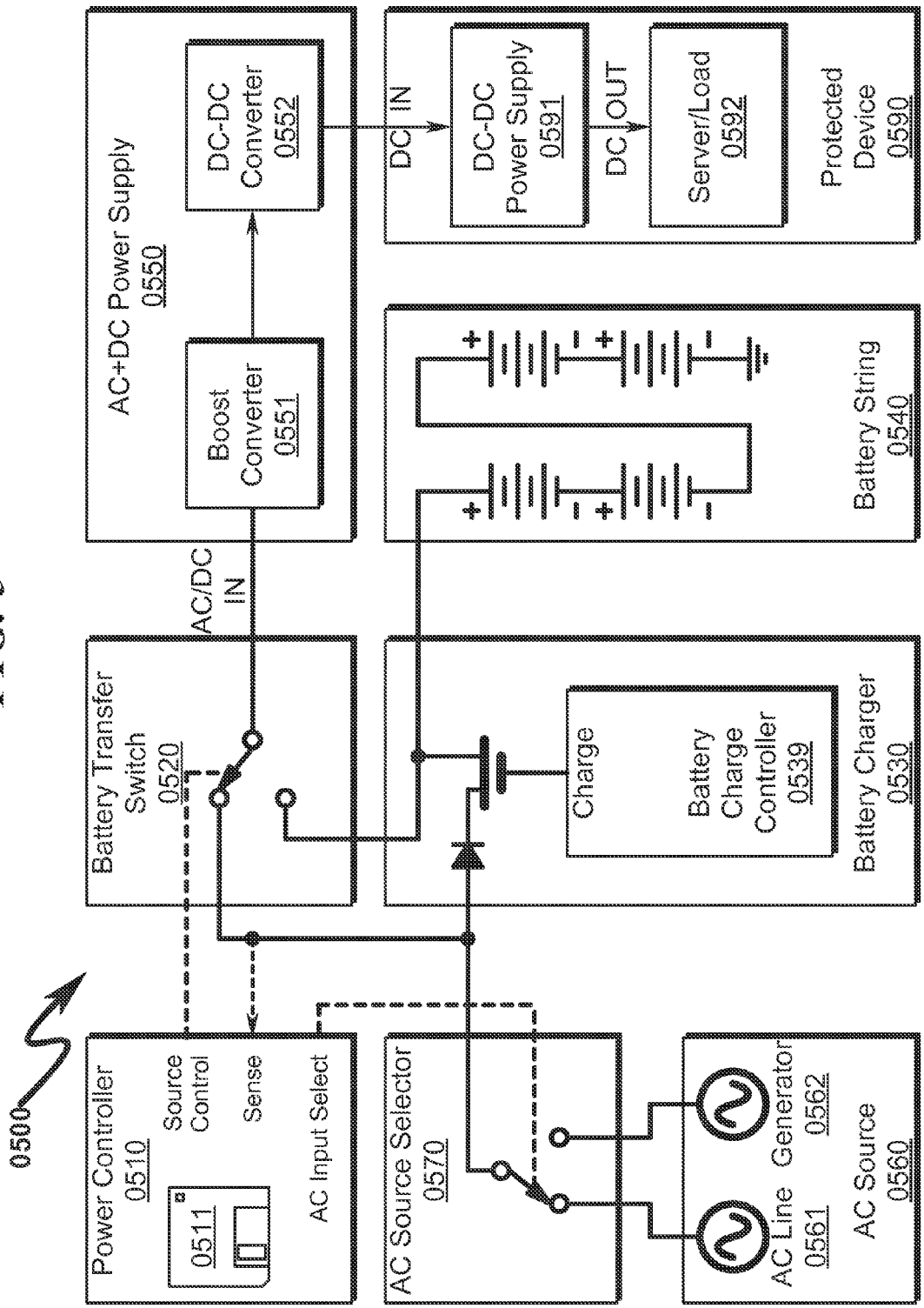
FIG. 5 illustrates a block diagram depicting an alternate preferred exemplary system embodiment of the present invention incorporating multiple AC sources.

As generally depicted in the alternate preferred exemplary system embodiment of FIG. 5 (0500), some preferred system embodiments may incorporate an AC source (0560) that comprises multiple sources such as AC utility line power (0561) and a backup AC source such as a generator (0562) or other power source. The use of an AC source selector (0570) permits switching among these various AC source (0560) options (0561, 0562) based on an AC input select control line activated by the power controller (0510) based on sensed power input conditions.

Alternate Method Overview (0600)

Figure 6:
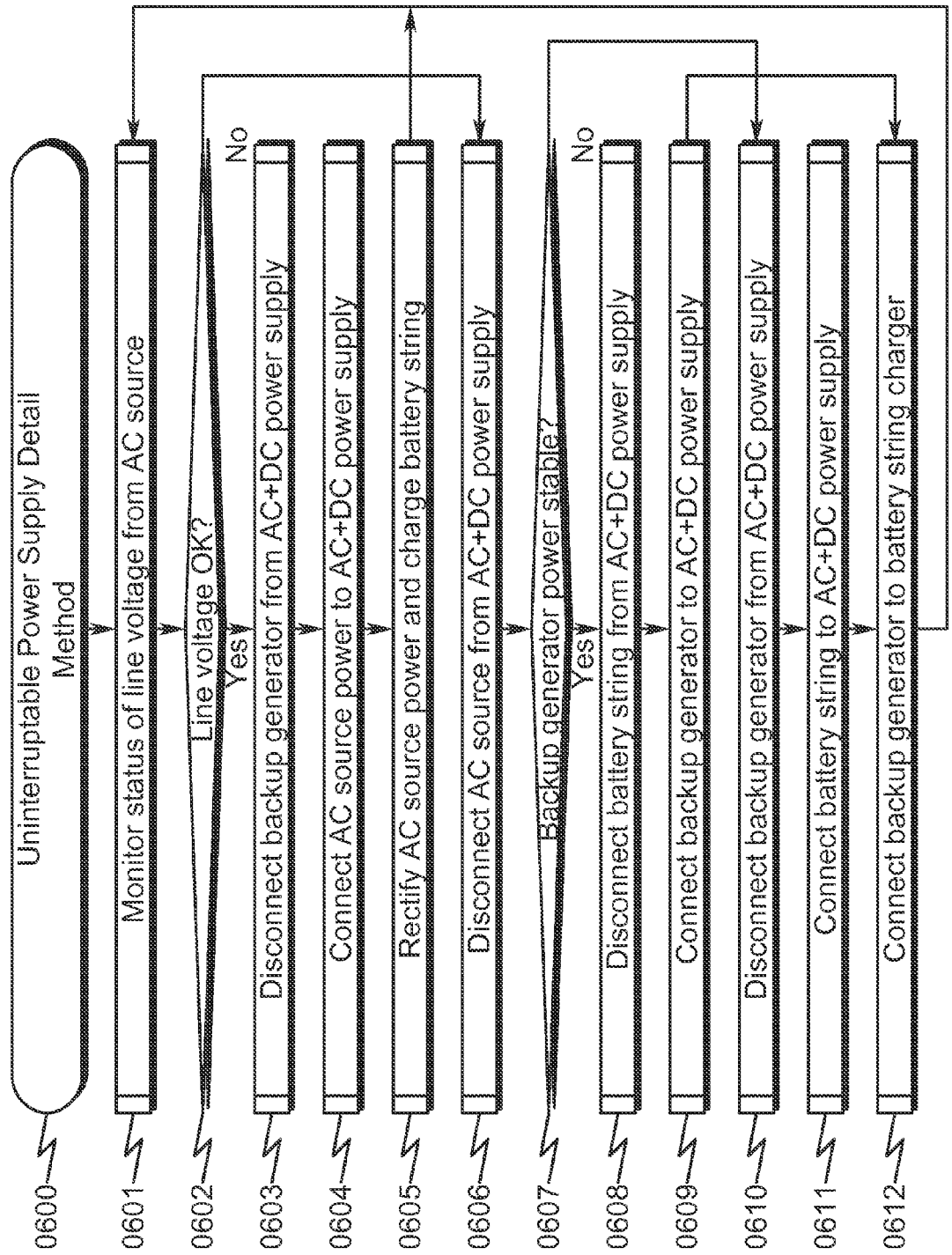
FIG. 6 illustrates a flowchart depicting an alternate preferred exemplary method embodiment of the present invention incorporating multiple AC sources.

The system context as depicted in FIG. 3 (0300) and FIG. 5 (0500) may be associated with an alternate methodology as depicted in FIG. 6 (0600) and involves the following steps:
(1) With a power controller, monitoring the status of line voltage from an AC source (0601);
(2) Determining if the AC source voltage is within predetermined limits and quality, and if not, proceeding to step (6) (0602);
(3) Disconnect backup generator from AC+DC power supply (0603);
(4) Connect the AC source power to a AC+DC power supply (0604);
(5) Rectify AC source power and charge battery string and proceed to step (1) (0605);
(6) Disconnect the AC source from the AC+DC power supply (0606);
(7) Determining if the backup generator voltage is within predetermined limits and quality, and if not, proceeding to step (10) (0607);
(8) Disconnect battery string from AC+DC power supply (0608);

(9) Connect backup generator to AC+DC power supply and proceed to step (12) (0609);
(10) Disconnect backup generator from AC+DC power supply (0610);
(11) Connect battery string to AC+DC power supply (0611); and
(12) Connect backup generator to battery string charger and proceed to step (1) (0612);

One skilled in the art will recognize that these method steps may be augmented or rearranged without limiting the teachings of the present invention. This general method overview may be augmented by the various elements described herein to produce a wide variety of invention embodiments consistent with this overall design description.

Alternate System Overview—Bypass (0700)

Figure 7:
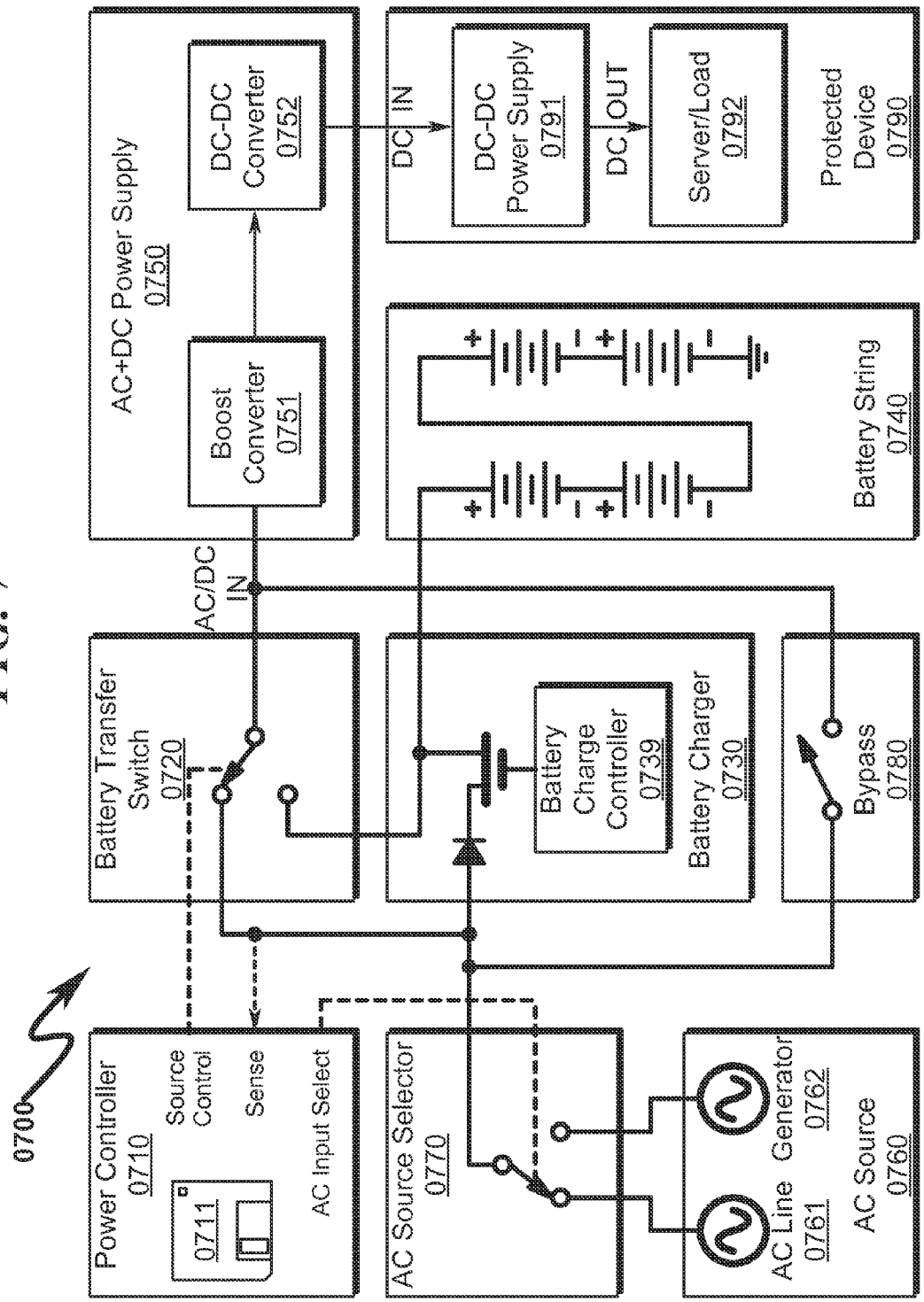
FIG. 7 illustrates a block diagram depicting an alternate preferred exemplary system embodiment of the present invention incorporating a bypass maintenance switch.

As generally depicted in the alternate preferred exemplary system embodiment of FIG. 7 (0700), some preferred system embodiments may incorporate a bypass switch (0780) that allows maintenance functions to be performed on the battery switch (0720), battery charger (0740), and/or battery string (0740). By closing the bypass switch (0780) these components are bypassed and may be removed, tested, or replaced without disrupting the overall operation of the AC+DC power supply (0750) and protected device (0790).

Alternate Method Overview (0800)

Figure 8:
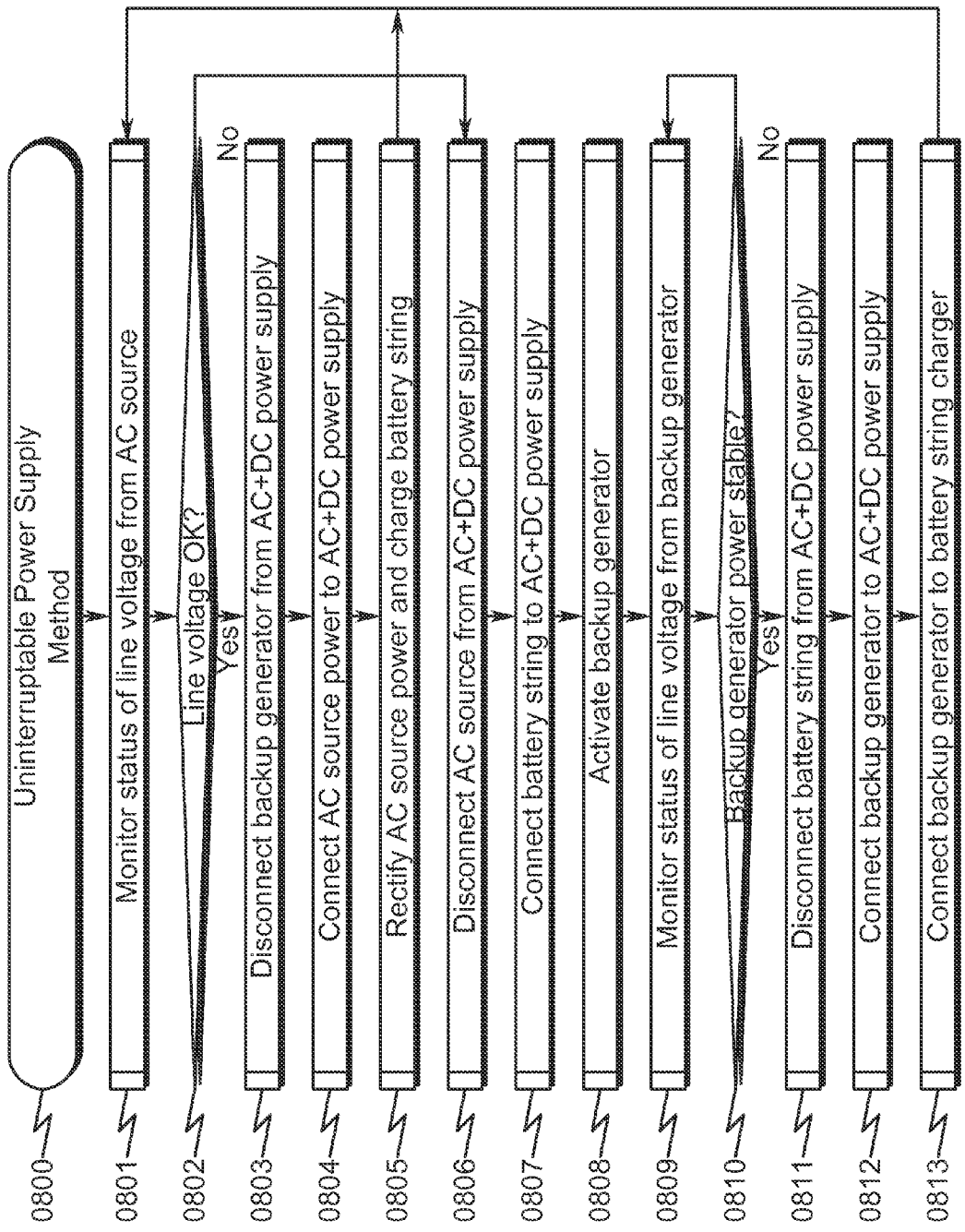
FIG. 8 illustrates a flowchart depicting an alternate preferred exemplary method embodiment of the present invention incorporating a bypass maintenance switch.

The system context as depicted in FIG. 3 (0300), FIG. 5 (0500), and FIG. 7 (0700) may be associated with an alternate methodology as depicted in FIG. 8 (0800) and involves the following steps:
(1) With a power controller, monitoring the status of line voltage from an AC source (0801);
(2) Determining if the AC source voltage is within predetermined limits and quality, and if not, proceeding to step (6) (0802);
(3) Disconnect backup generator from AC+DC power supply (0803);
(4) Connect the AC source power to a AC+DC power supply (0804);
(5) Rectify AC source power and charge battery string and proceed to step (1) (0805);
(6) Disconnect the AC source from the AC+DC power supply (0806);
(7) Connect battery string to AC+DC power supply (0807);
(8) Activate the backup generator (0808);
(9) Monitor the status of the backup generator (0809);
(10) Determining if the backup generator voltage is within predetermined limits and quality, and if not, proceeding to step (8) (0810);
(11) Disconnect battery string from AC+DC power supply (0811);
(12) Connect backup generator to AC+DC power supply (0812); and
(13) Connect backup generator to battery string charger and proceed to step (1) (0813).

One skilled in the art will recognize that these method steps may be augmented or rearranged without limiting the teachings of the present invention. This general method overview may be augmented by the various elements described herein to produce a wide variety of invention embodiments consistent with this overall design description.

While this method is similar to that depicted in FIG. 6 (0600), it provides for starting the backup generator in situations where it may not be active when power fails. Additionally, it provides for use of the backup generator in charging the battery string during the power outage.

General System Description (0900)-(1100)

Figure 9:
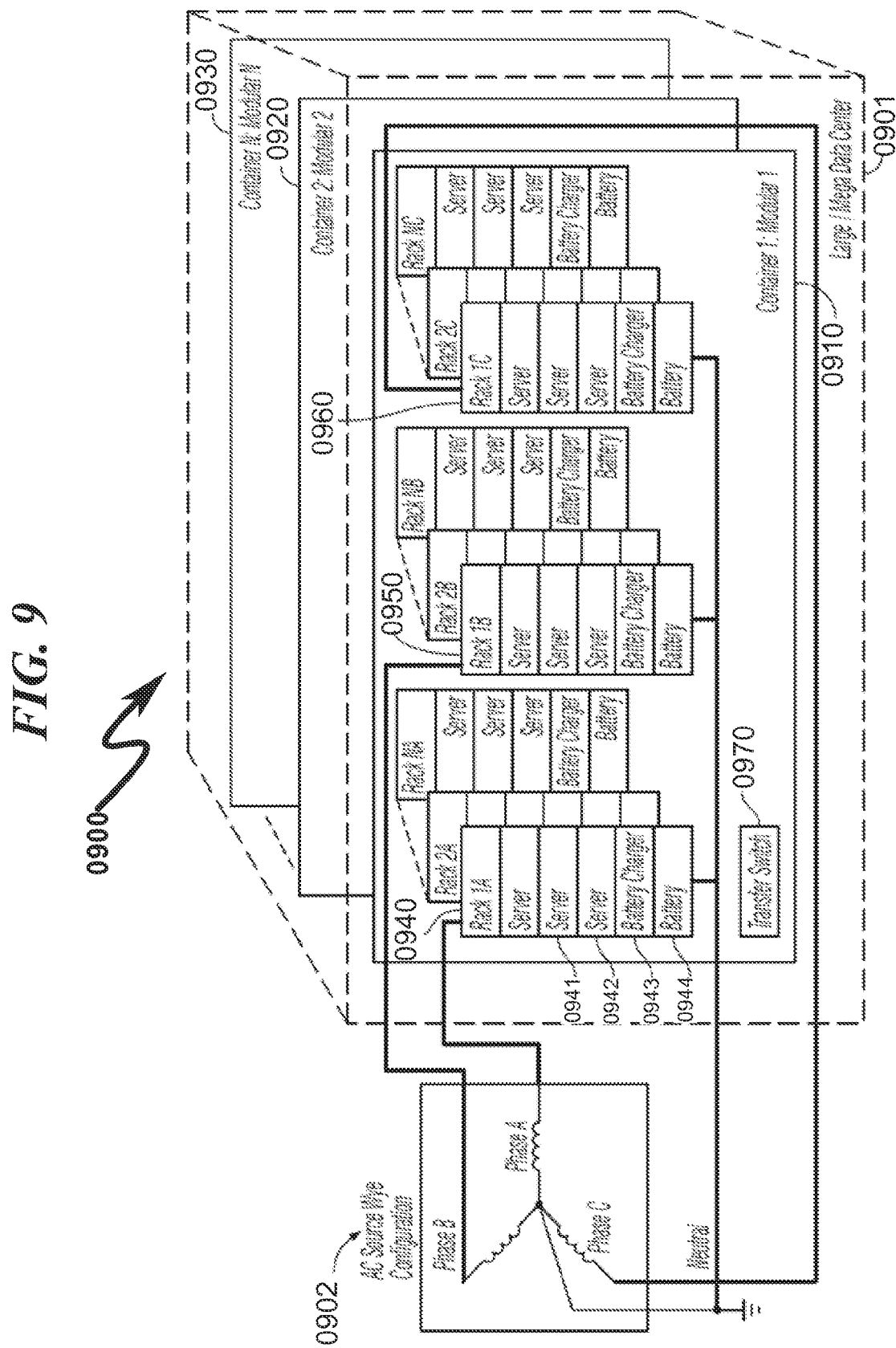
FIG. 9 illustrates an example of a distributed mega/larger data center which contains multiple modular/containerized data centers. Within each identically-structured modular/containerized data center are multiple server racks. The illustrated system is powered by a three-phase AC system evenly distributed to server racks within each modular/container data center.
Figure 10:
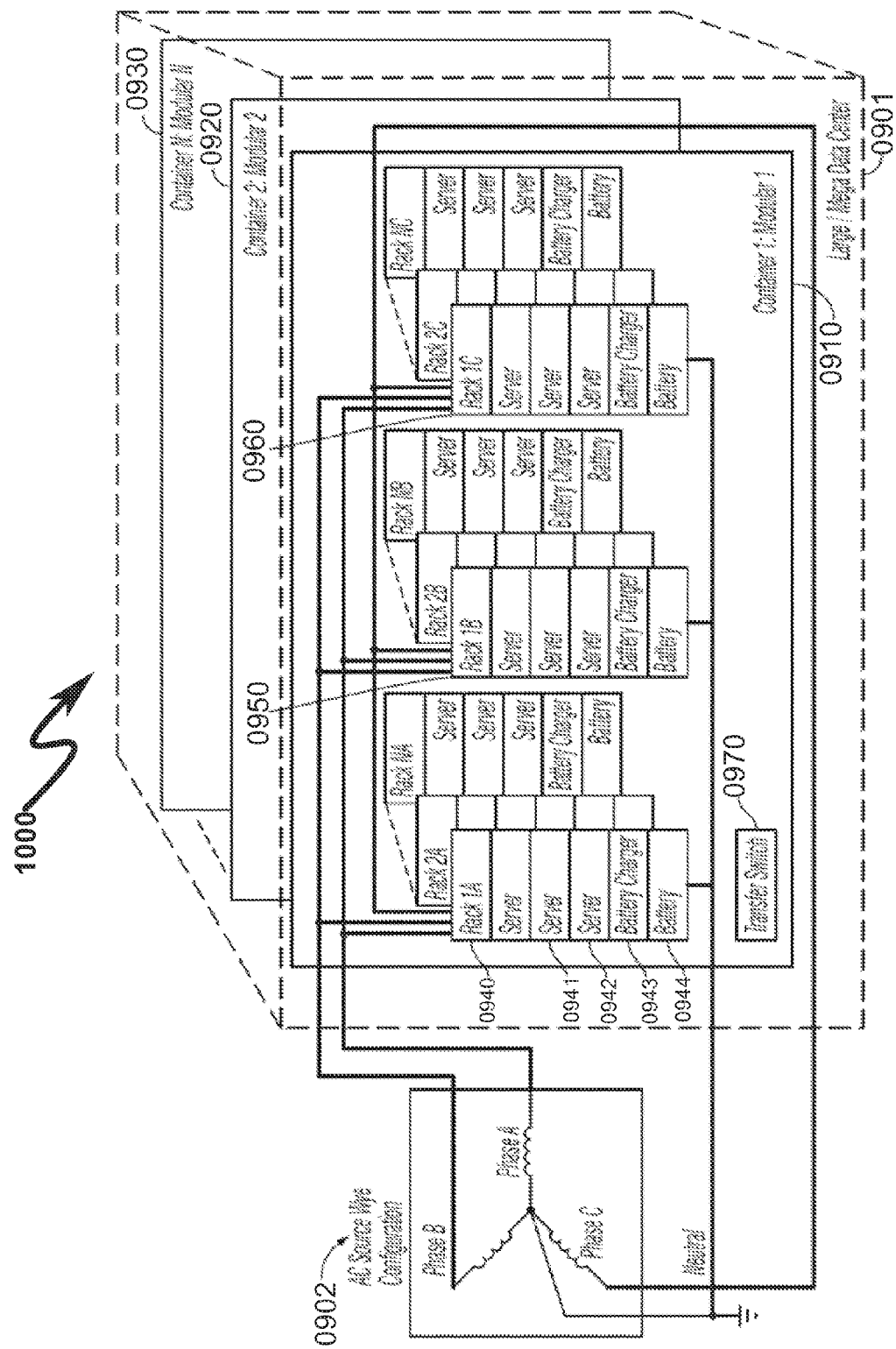
FIG. 10 illustrates an example of a distributed mega/larger data center which contains multiple modular/containerized data centers. Within each identically-structured modular/containerized data center are multiple server racks. The illustrated system is powered by a single-phase AC system evenly distributed to server racks within each modular/container data center.
Figure 11:
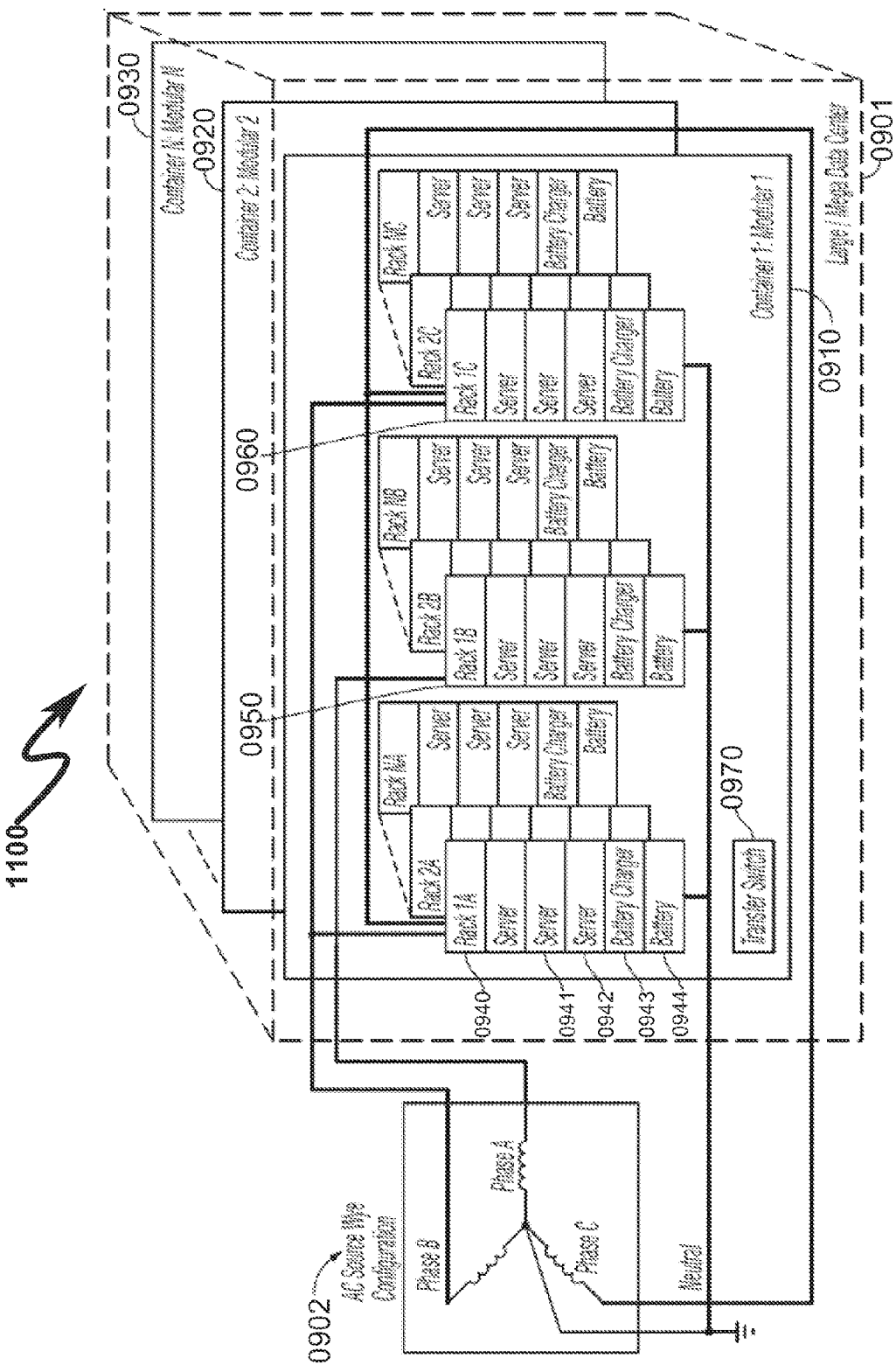
FIG. 11 illustrates an example of a distributed mega/larger data center which contains multiple modular/containerized data centers. Within each identically-structured modular/containerized data center are multiple server racks. The illustrated system is powered by single-phase and three-phase AC systems evenly distributed to server racks within each modular/container data center.

FIG. 9 (0900)-FIG. 11 (1100) depict block diagrams illustrating exemplary operation and construction for a large/mega data center (0901). This data center is composed of a number of modular/container data centers (0910, 0920, 0930). Within each modular/container data center, a number of modular racks also referred to server racks (0940, 0950, 0960) can stack numerous servers (1205). The battery strings (1240) and battery chargers (1230) along with battery transfer switches (0970) in the modular/container data center are either installed in the same rack along with the server or mounted in a separate rack. AC source (0902) is a three-phase WYE configuration. One phase voltage and neutral line are distributed to each rack (0940, 0950, 0960) to form a balanced load. A similar distribution may be used if modular/container data centers (0910, 0920, 0930) are installed. In each of racks (0940, 0950, 0960) there are multiple servers (1205), configured to maintain a balance load among (0940, 0950, 0960).

Distributed Uninterrupted Power/Power Conditioner (1200)

Figure 12:
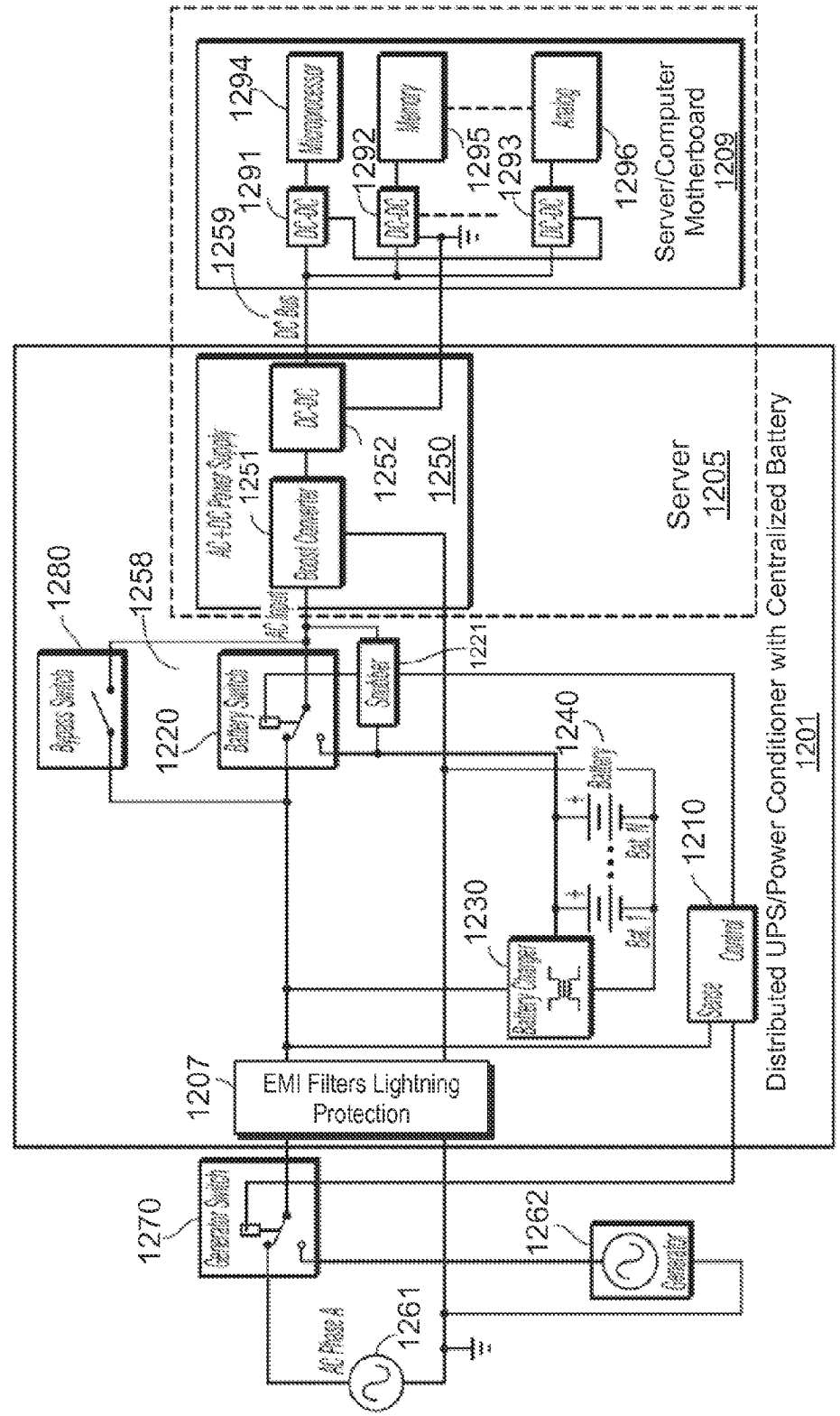
FIG. 12 illustrates a preferred exemplary embodiment of the present invention incorporating distributed UPS/power conditioner architecture with centralized battery feeds into a server. The distributed UPS/power conditioner with centralized battery includes: an AC-DC power supply which can operate either in AC or specified DC input voltage with the same input connector; battery strings; a battery transfer switch between AC; battery strings; and server; a controller; an isolated battery charger; and an EMI/lightning circuitry block. The system is powered from a WYE configuration single-phase AC input. During power failure, the battery transfer switch will switch from utility to DC battery strings. For long duration of power outage, the backup generator switch will connect to the backup generator and charge the battery to power the server.

FIG. 12 (1200) illustrates a distributed uninterrupted power/power conditioner with centralized battery backup energy storage architecture (1201) for a server rack (0940) (FIG. 9 (0900)-FIG. 11 (1100)) in the modular/container data center (0910) (FIG. 9 (0900)-FIG. 11 (1100)). In this example, the modular data center (0910) includes a number of server racks (0940, 0950, 0960), each containing a number of servers (1205). Each server (1205) includes an AC-DC power supply (1250) and a server/computer motherboard (1209). The AC-DC power supply (1250) is configured to accept AC input (85 VAC-240 VAC, 40-75 Hz) or DC input (85 VDC×$\sqrt{2}$-240 VDC×$\sqrt{2}$), and processes this input internally through two series power conversion stages comprising a boost converter (1251) and a DC-DC converter (1252) and converts this power input to a DC bus (1259) (regulated DC 10-14V or semi-regulated DC bus 10-14 VDC±10%) and feeds the result into a server/computer motherboard (1209). The server/computer motherboard contains DC-DC converters (1291, 1292, 1293). The DC-DC converters (1291, 1292, 1293) converts input voltage from 10-14 VDC to a regulated lower DC level such as 1.2V, 3.3V, 5V, ±12 VDC to power the IT loads (microprocessor (1294), memory (1295), analog circuitry (1296), etc.).

Normal Operation

Under normal operating conditions, server AC input (1258) receives power from the utility grid AC source (1261), and then transmits power into AC-DC power supply (1250). In this condition, AC-DC power supply works in AC input mode, converting the AC input (1258) to DC bus (1259) (DC bus voltage 10-14 VDC) voltage, then powering the server/computer motherboard (1209). In the meantime, battery strings (1240) get charged via battery charger (1230) to a voltage level between 85 VDC×$\sqrt{2}$-240 VDC×$\sqrt{2}$ preset by battery charger (1230).

Power Fail Operation

In an AC utility (1261) power fail situation, the controller (1210) senses the utility grid AC source (1261) falls outside its normal range (for a 120V nominal AC input voltage falls below a first threshold of 90V in any half cycle, or if the RMS voltage drops below a second cycle of 100V for a pre-specified time and conditions which may include but not limited to brownouts, blackouts, voltage sag, surges, instabilities). The controller (1230) will cause battery transfer switch (1220) to switch to battery backup mode, connecting battery strings (1240) to AC-DC power supply (1250). Consequently, controller (1210) causes the generator transfer switch (1270) to connect to backup generator (1262) and disconnects from the AC utility source (1261). During battery backup conditions, the AC-DC power supply (1250) operates at DC input mode, taking DC voltage from the pre-charged battery string (1240) (voltage range 85 VDC×$\sqrt{2}$-240 VDC×$\sqrt{2}$) and converting to a lower voltage DC bus (1259) (10-14 VDC), then powers the server/computer motherboard (1209).

In battery backup mode, the battery transfer switch (1220) will switch to battery backup mode within half AC cycle (less than 8 milliseconds) controlled by controller (1210) when AC utility (1261) falls out of its specified range. The generator transfer switch (1270) takes a few minutes to connect to backup generator (1262), breaking away from the utility line (1261). The generator transfer switch (1270) switching timing is such that it has to connect to generator (1262) before battery strings (1240) run out of energy to supply server load (1209).

Referring to FIG. 12 (1200) in backup generator mode, battery transfer switch (1220) stays connected to the battery string (1240), then AC-DC power supply (1250) operates at DC input mode and server power will come from backup generator (1262) to the battery charger (1230), then to battery string (1240), then connect to AC power supply (1250), and server (1205) will operate at DC input mode. Alternatively, in this backup generator condition, the battery transfer switch (1220) can switch back to connect to utility mode and break away from battery strings (1240), thus enabling AC-DC power supply (1250) to operate at AC input mode. In this scenario, the server power will come from the backup generator (1262) to transfer switches (1270, 1220) then connect to the AC power supply (1250). In summary, during backup generator mode, the battery transfer switch (1220) can stay on either AC or DC mode on either mode to power server (1205). When the AC utility (1261) comes back to a normal state, the controller (1210) will coordinate transfer switches (1220, 1270) back to utility connected mode, and the server (1205) will connect back to the AC utility (1261) to operate the AC input mode powered by AC utility (1261).

The AC power supply (1250) consists internally of two power stages: Boost converter (1251), and DC-DC converter (1252). The boost converter (1251) provides active power factor correction to generate a theoretical power factor of over 95%. Active power factor also markedly diminishes total harmonics and automatically corrects for AC input voltage. The boost converter (1251) can work with either at AC input or DC input. The DC-DC converter (1252) converts its input DC input voltage to a lower DC bus voltage (1259) (10-14 VDC regulated or semi-regulated 10-14 VDC±10%) then feeds into server/computer motherboard (1209).

The server (1205) consists of AC-DC power supply (1250) and motherboard (1209). The motherboard (1209) has two sections: DC-DC converters (1291, 1292, 1293) and the IT load microprocessor (1294), memory (1295), analog circuit (1296), etc. The motherboard takes DC bus voltage (1259) (10-14 VDC) via internal converters (1291, 1292, 1293) and converts to a lower voltage (0.9 VDC-5.0 VDC or other specified DC voltage) to power the IT load microprocessor (1294), memory (1295), analog circuit (1296), etc. The motherboard (1209) IT loads can be a single device or multiple devices depending on the application context.

Bypass Operation

The bypass switch (1280) is connected in parallel with the battery transfer switch (1220) to serve two functions:

(i) Maintenance: In this application, the switch (1280) bypasses the battery transfer switch (1220) along with battery strings (1240) when battery strings (1240) and the battery transfer switch (1220) need to conduct regular maintenance or battery tests.

(ii) Redundant Transfer: The bypass switch (1280) can serve as a redundant transfer switch for battery transfer switch (1220) to prevent single point failure and to increase system reliability.

The snubber circuit (1221) located across battery transfer switch (1220) serves as an energy absorber to suppress the arc across the battery transfer switch (1220) when switches from DC mode to AC mode.

EMI/Lightning circuitry (1207) serves lighting/line surge protection as well as noise suppression function. It contains EMI filter, energy absorber and suppressor.

Features/Functions

The distributed uninterrupted power/power conditioner centralized battery energy storage architecture (1201) depicted in FIG. 12 (1200) serves three distinct functions:

Power Conditioner

The AC-DC power supply (1250) is designed to meet "power line disturbance" (meeting CBEMA curve requirement) and "AC waveform distortions" (power line harmonics, voltage fluctuation, AC power frequency variations) requirements. EMI/Lightning circuitry (1207) serves lightning/line surge protection as well noise suppression functions.

Uninterrupted Power

Battery strings (1240), battery transfer switch (1220), battery charger (1230), and controller (1210) serve the uninterrupted power supply function. During AC failure, the battery transfer switch (1220) will break away from utility and connect to DC battery string (1240) per controller (1210) command to provide power continuity to the IT load.

Centralized Battery

As depicted in FIG. 6, the system centralizes the battery storage (1240) providing backup power to redundant or multi-system applications. This centralized battery architecture can provide the same energy storage requirements as that of a distributed battery system, while significantly reducing battery count.

Reference AC Inputs

Unless otherwise indicated, reference to AC utility input voltage is a single-phase or three-phase system composed of a sinusoidal waveform at frequency between 45 Hz to 500 Hz and a RMS (root mean square) value between 85V to 480V. The AC utility is configured in either a WYE connection or a DELTA connection. As shown system FIG. 9 (0900)-FIG. 11 (1100), the AC source (0902) is a WYE configuration, with a single-phase or three-phase voltage and neutral line distributed to each rack (0940, 0950, 0960) to form a balanced load. A similar distribution may be used for modular/container data center (0910, 0920, 0930). Inside each rack (0940, 0950, 0960) are multiple servers (0941, 0942)) which are configured to a balance load between racks (0940, 0950, 0960) to maintain a balanced three-phase AC system. By the same token, the AC source (0902) can be configured a DELTA system (not shown); power line voltage 480V AC (phase to phase) can be distributed to modular/container data centers (0910, 0920, 0930). For each modular/container data center (0910, 0920, 0930), individual phase voltage 240 VAC (phase to neutral) can be routed to rack (0940, 0950, 0960). The load balancing technique is the same as that in WYE configuration.

Steady State Power Flow Path (1300)

Figure 13:
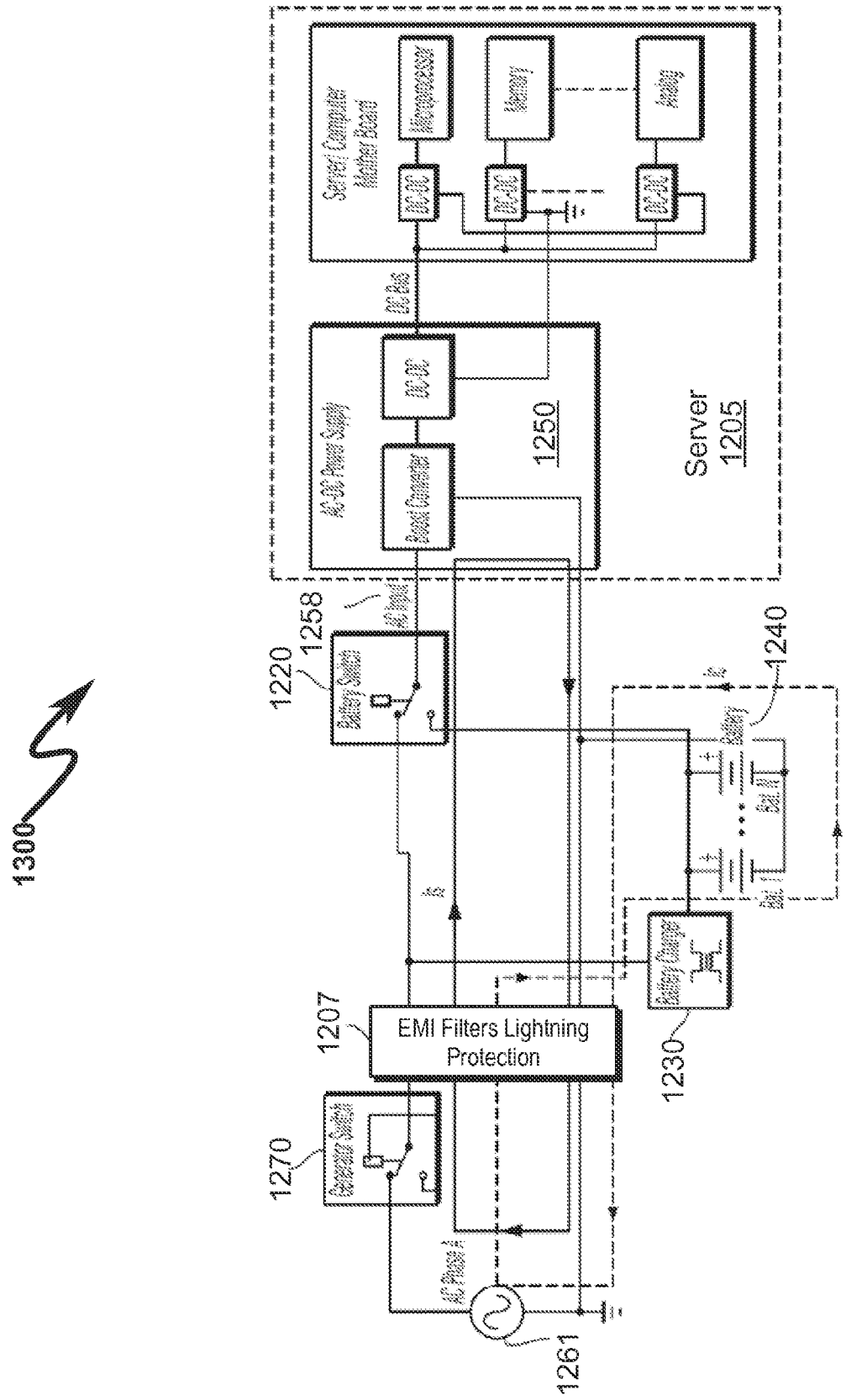
FIG. 13 illustrates the power path of the present invention during normal operating conditions.

FIG. 13 (1300) illustrates the power flow path in steady state normal operating condition in which the server (1205) is powered by AC source (1261). The AC source provides two current paths. The Is path is the primary current path via generator transfer switch (1270) and battery transfer switch (1220) provides input power to AC-DC power supply (1250). The Ic path is the battery which goes through generator transfer switch (1270) and battery charger (1230) charging battery strings (1240).

Power Outage Power Flow Path (1400)

Figure 14:
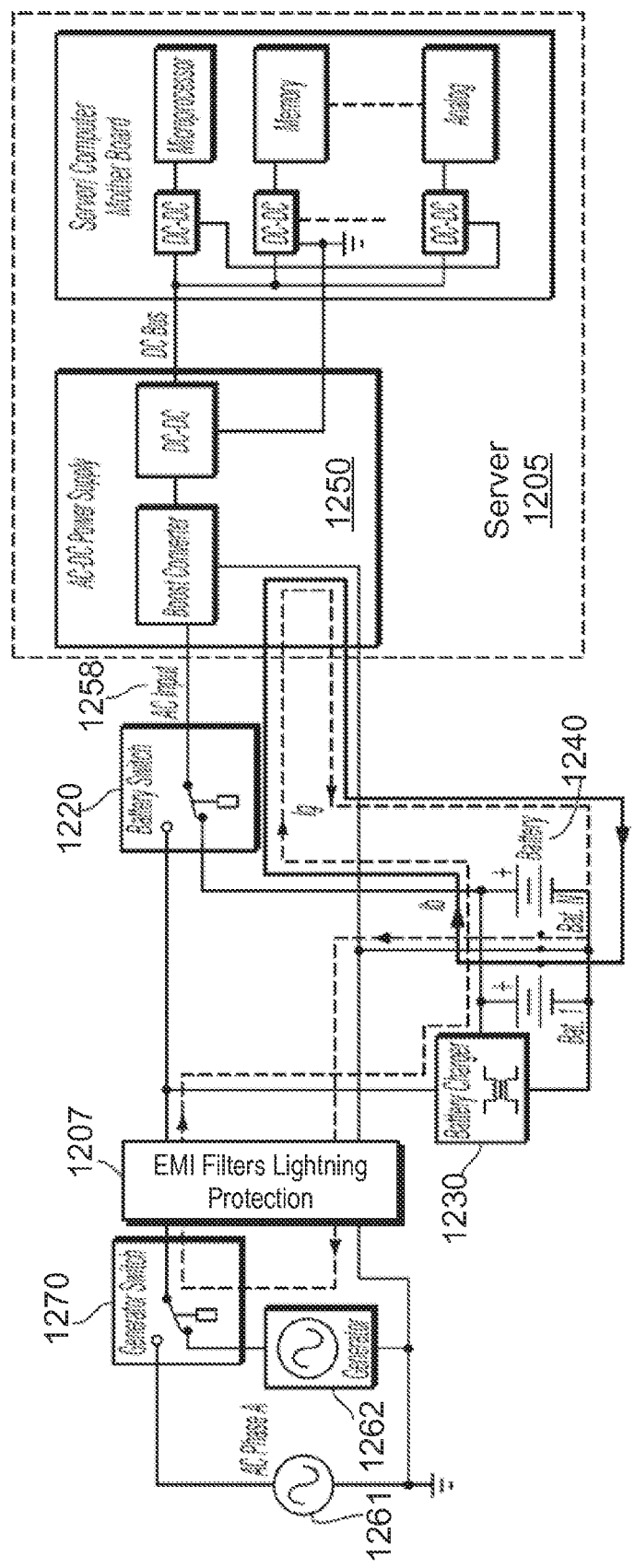
FIG. 14 illustrates the power path of the present invention in battery backup UPS conditions.

FIG. 14 (1400) illustrates the power path during power outage, uninterrupted (DC battery backup) power condition. When utility power fails, battery transfer switch (1220) connects to battery strings (1240) and generator transfer switch (1270) connects to backup generator (1262). The server (1205) receives power from the DC battery strings (1240) through the battery transfer switch (1220) to the AC-DC power supply (1250) via current path Ib. In this mode, the generator (1262) provides power through the battery charger (1230), charging battery strings (1240) and also providing power to AC-DC power supply (1250) via current path Ig.

Basic Boost Converter Architecture (1500)

Figure 15:
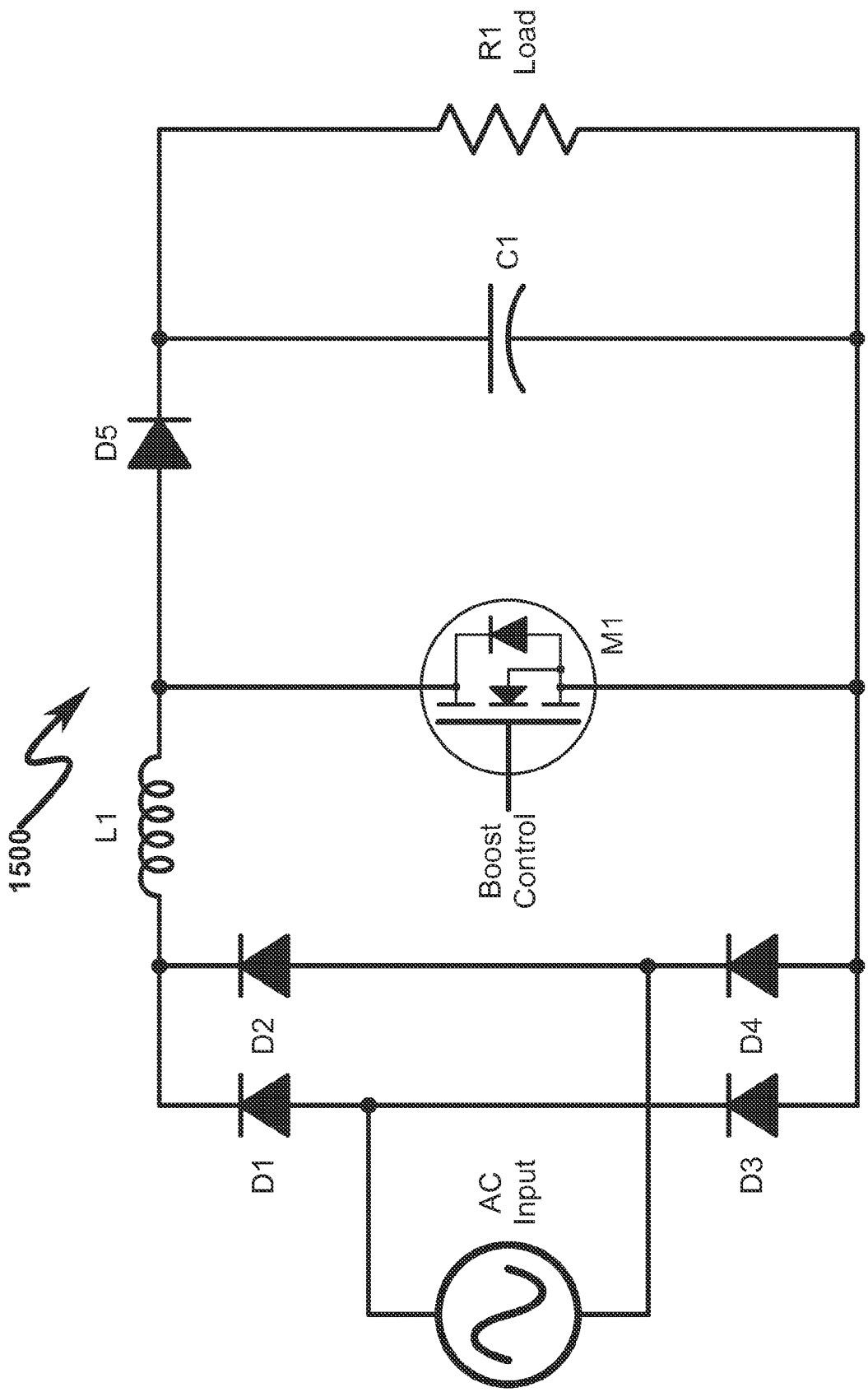
FIG. 15 illustrates a basic boost converter schematic. Most AC-DC power supplies have already designed-in a boost converter to protect against the AC waveform distortion (harmonics, voltage fluctuation, AC power frequency variations) and power line disturbance (as depicted in the FIG. 1 (0100) CBEMA curve)

FIG. 15 (1500) is the basic schematic of a boost converter. A typical AC-DC power supply has designed-in a boost converter to protect against AC waveform distortion (harmonics, voltage fluctuation, AC power frequency variations) and power line disturbance (FIG. 1 (0100) CBEMA curve). The boost converter can also provide active power factor correction, typically generating a theoretical power factor of over 95%, and also markedly diminishes total harmonics generated by power supply and its load.

Basic Boost Converter During Battery Backup Mode (1600)

Figure 16:
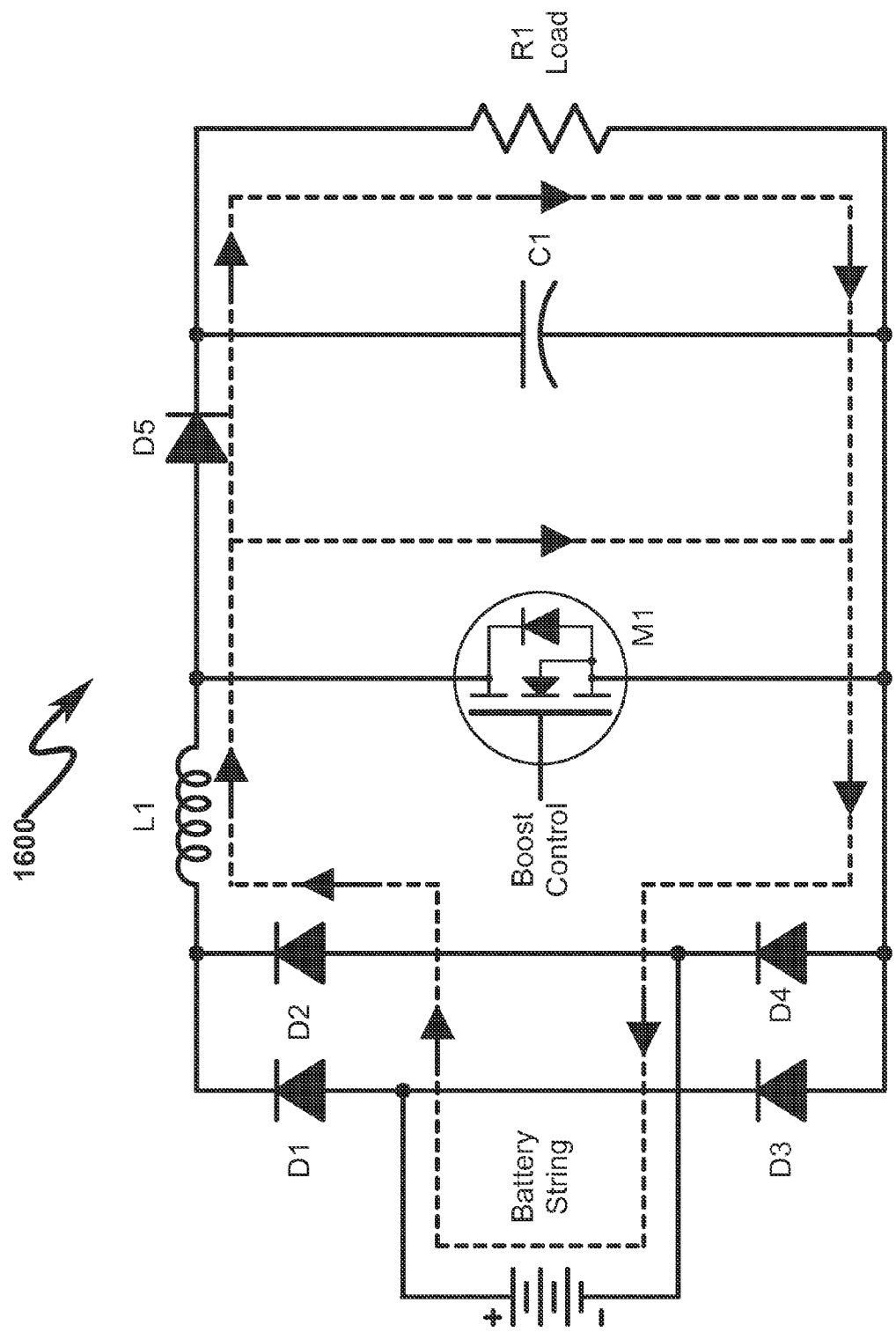
FIG. 16 illustrates the boost converter current path Ib in DC battery backup mode.

FIG. 16 (1600) illustrates the boost converter current path Ib during DC battery backup mode: the boost converter becomes a DC-DC boost converter with diode D1 and D4 conducting current at all times, while diodes D2 and D3 are back-biased without any current flowing. In this operation, diodes D1 and D2 need to be adequately sized in order to handle the power dissipation either in AC or DC operating mode. The novelty here is that during the DC battery backup mode, the battery (1240) can utilize the existing AC-DC power supply (1250) boost converter (1251) as a DC-DC boost converter and convert its output voltage to the required voltage for the IT load, thus eliminating another external boost converter. This arrangement can save cost, space and improve overall system efficiency as well.

Boost Converter Topologies (1700)-(2400)

Figure 17:
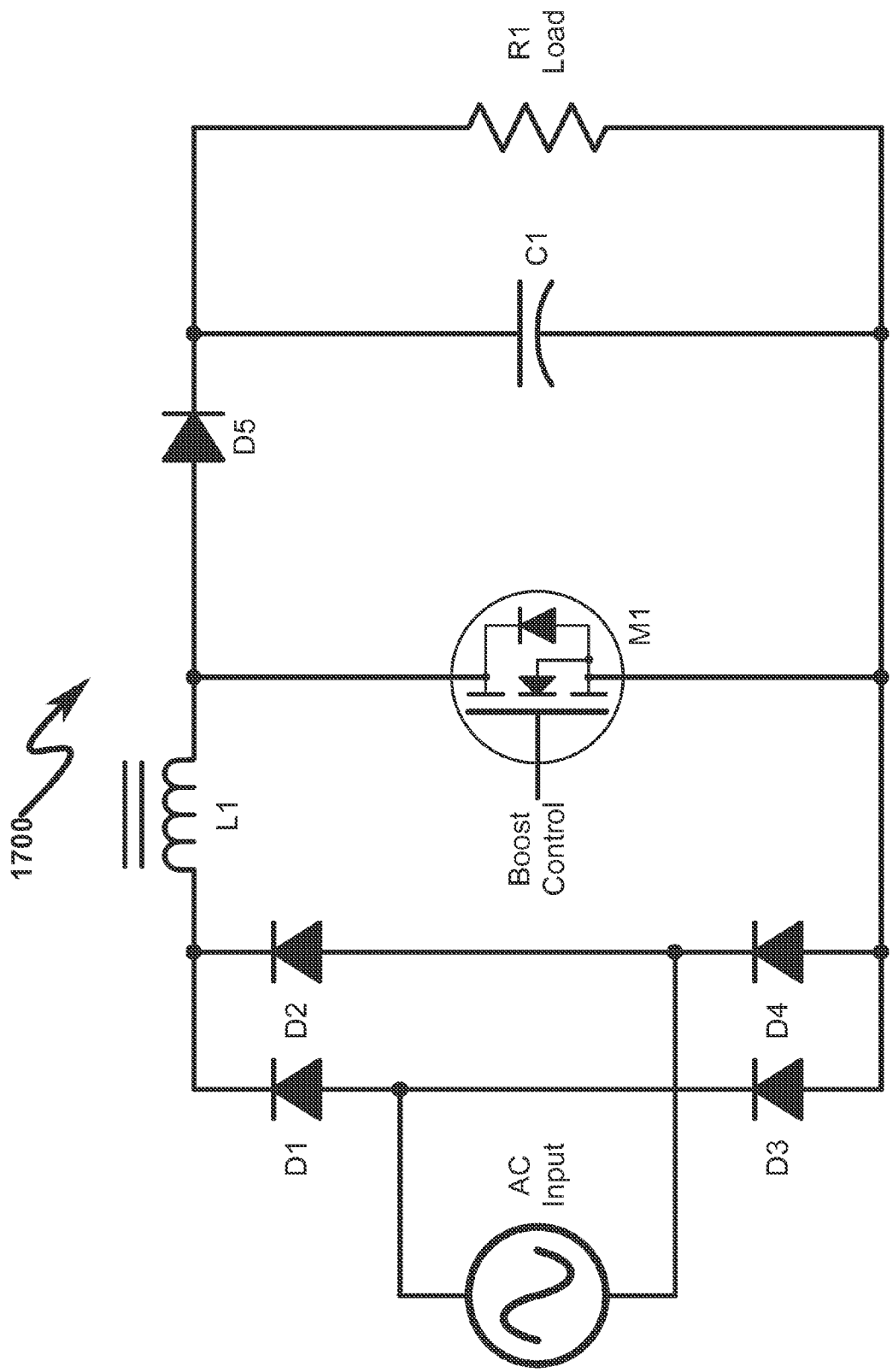
FIG. 17 illustrates a schematic of an exemplary PFC boost converter useful in some preferred invention embodiments. The boost converter (as depicted in FIG. 17-FIG. 24) can provide Power Factor Correction (PFC) at the input stage, and possess very low line harmonics and provide close to unity power factor. Almost all AC-DC power supplies for IT equipment utilize boost converter topologies with active power factor correction.
Figure 18:
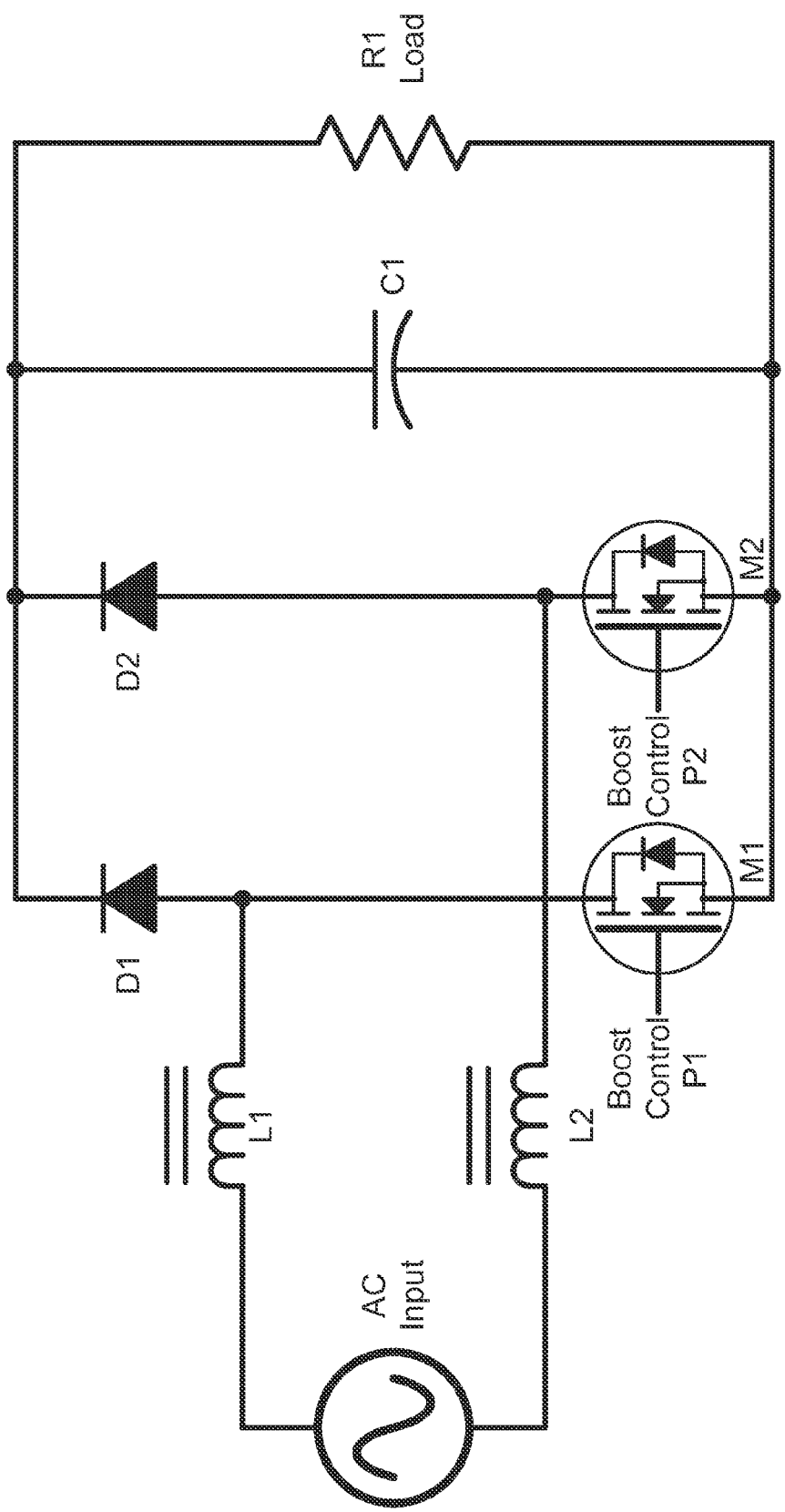
FIG. 18 illustrates a schematic of an exemplary bridgeless boost converter useful in some preferred invention embodiments.
Figure 19:
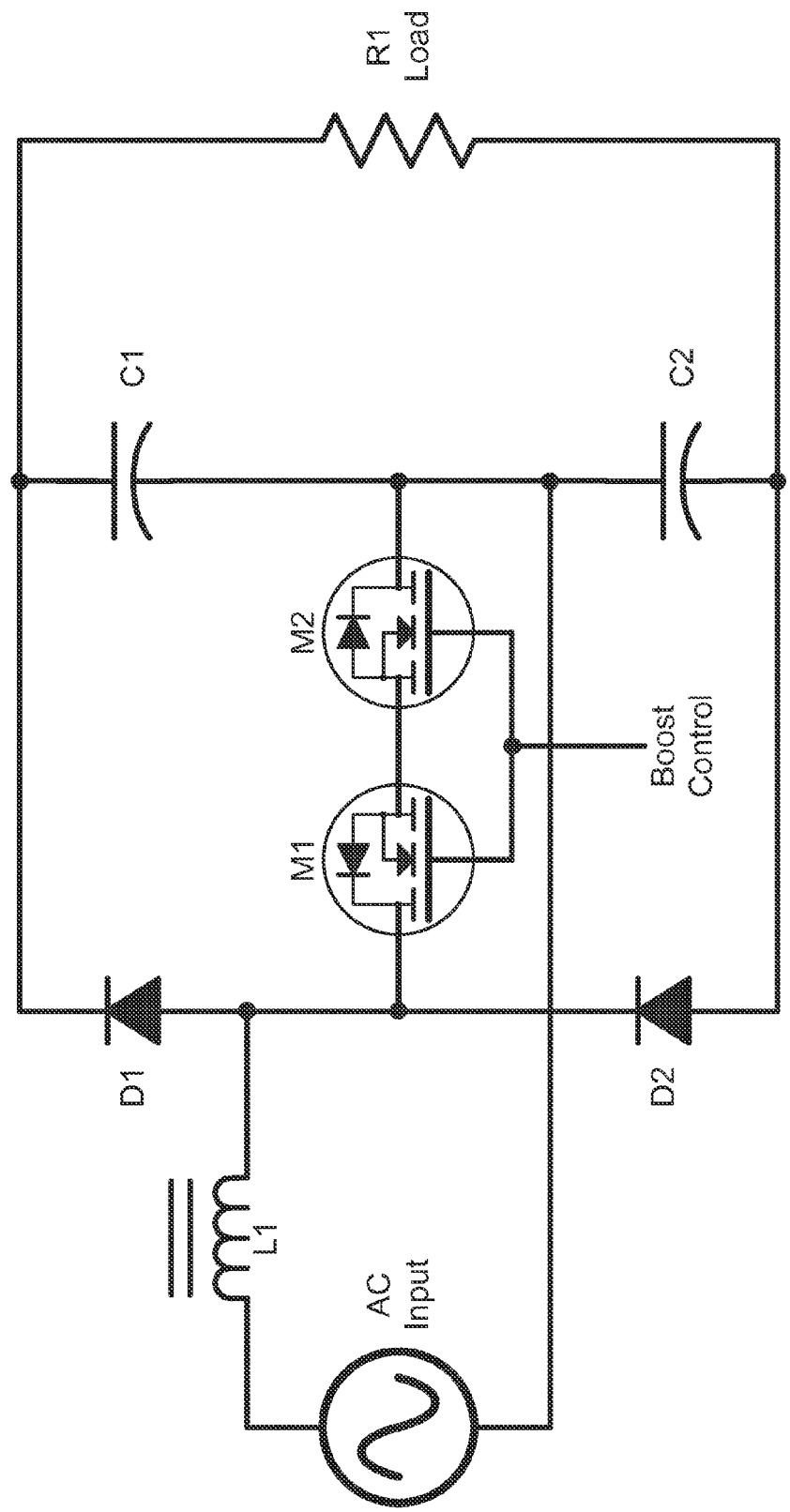
FIG. 19 illustrates a schematic of an exemplary single-phase PFC boost converter useful in some preferred invention embodiments.
Figure 20:
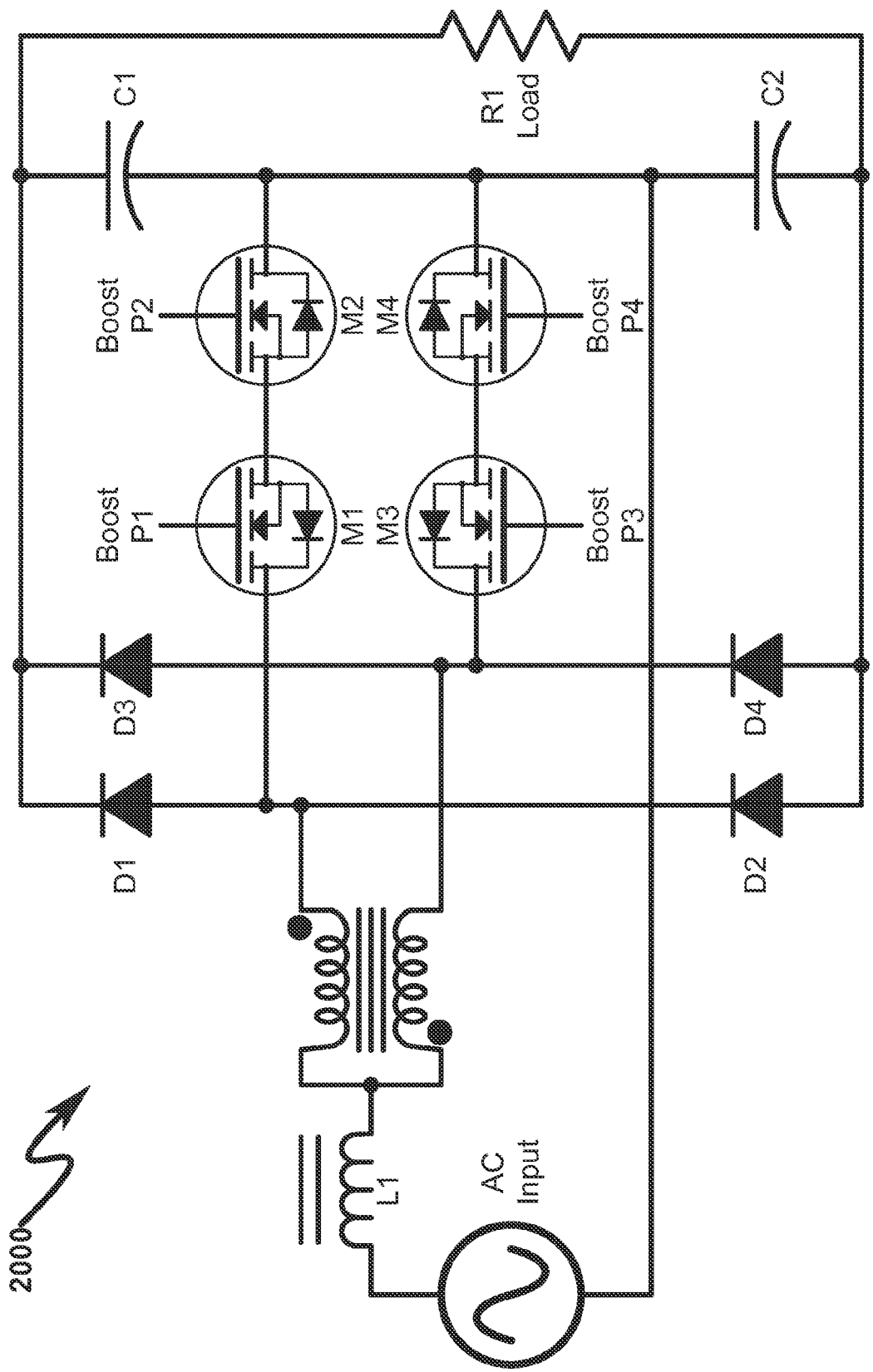
FIG. 20 illustrates a schematic of an exemplary multi-state Vienna PFC boost converter useful in some preferred invention embodiments.
Figure 21:
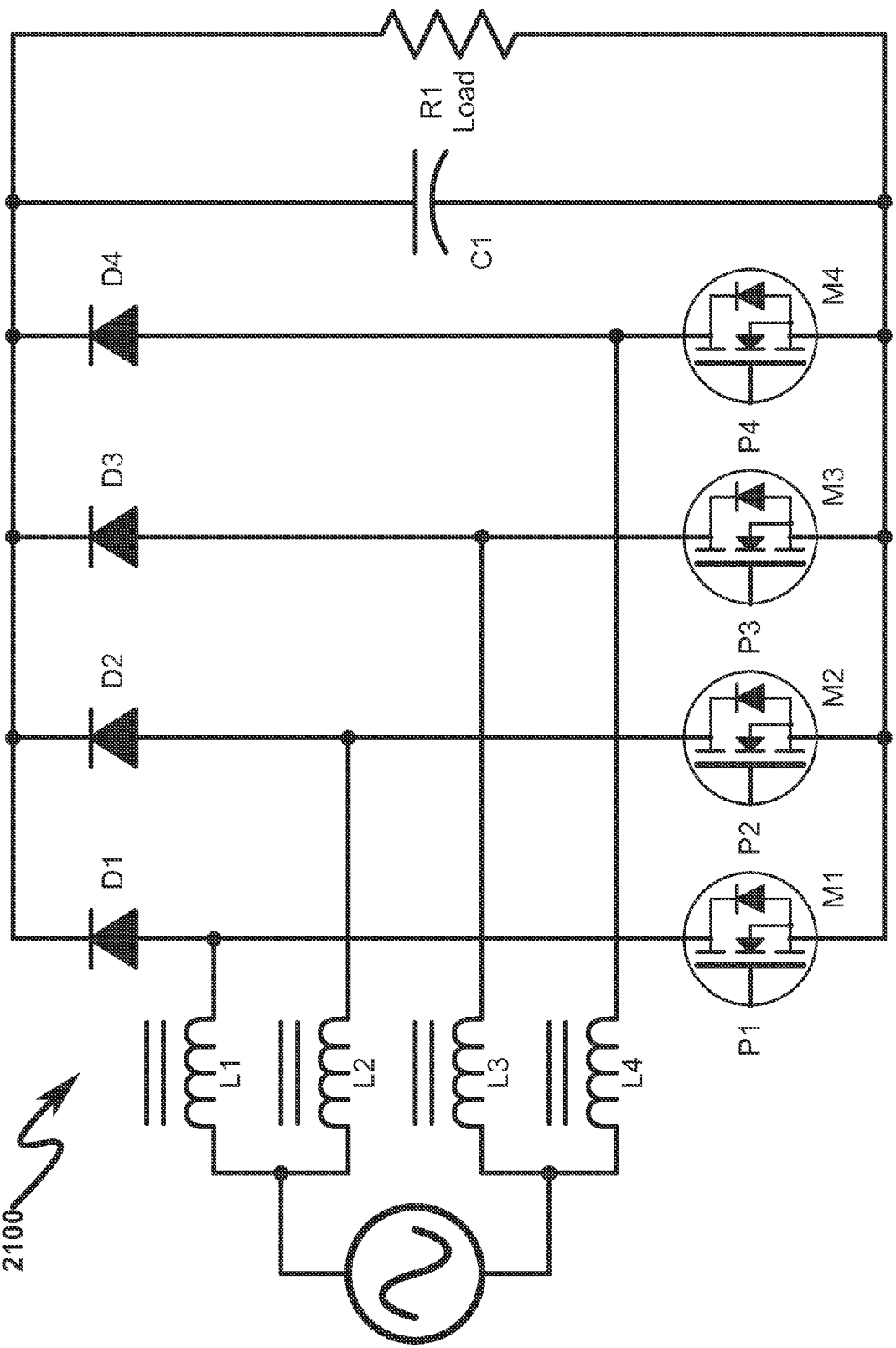
FIG. 21 illustrates a schematic of an exemplary interleaved bridgeless PFC boost converter useful in some preferred invention embodiments.
Figure 22:
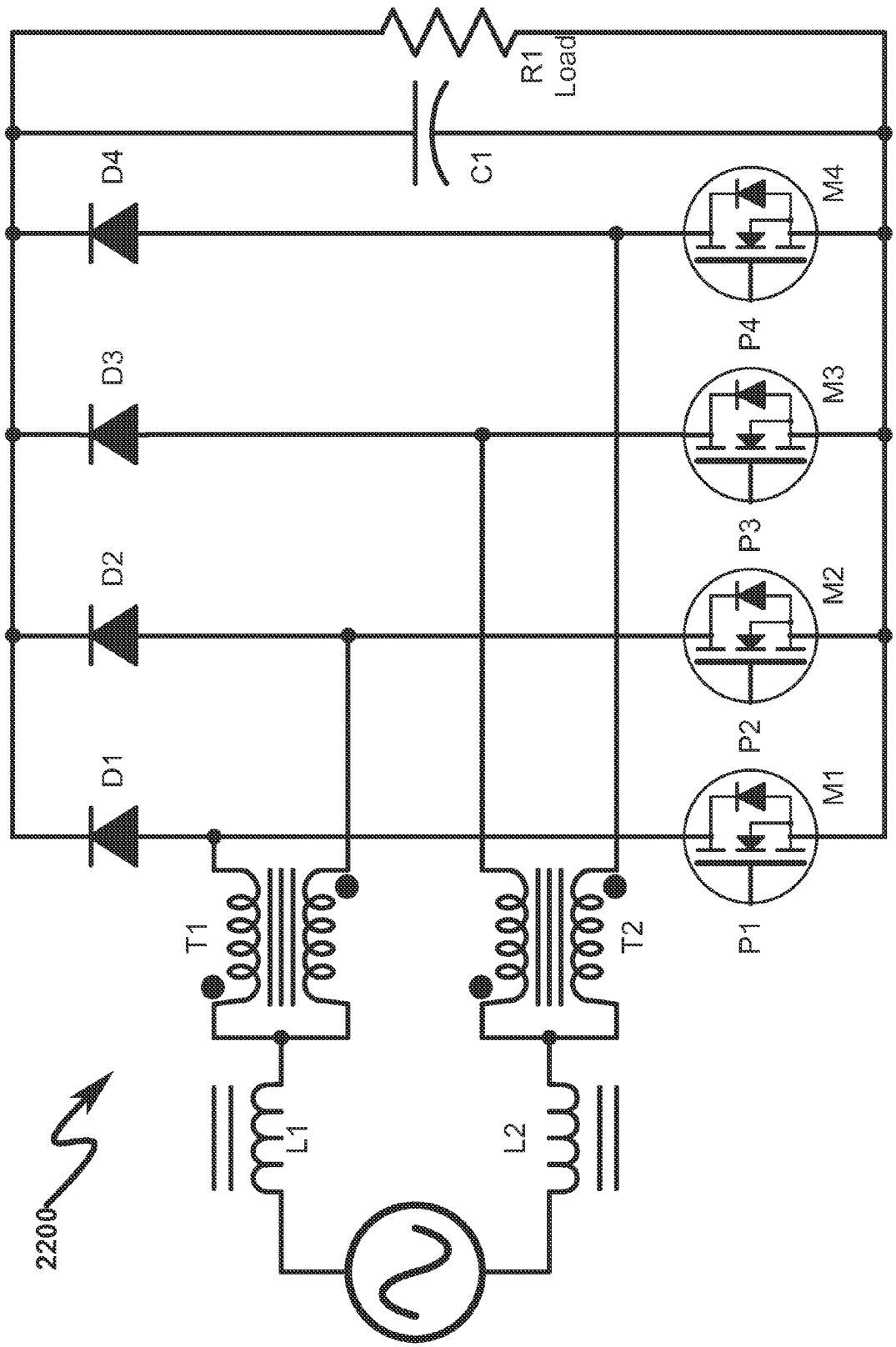
FIG. 22 illustrates a schematic of an exemplary multi-state bridgeless PFC boost converter useful in some preferred invention embodiments.
Figure 23:
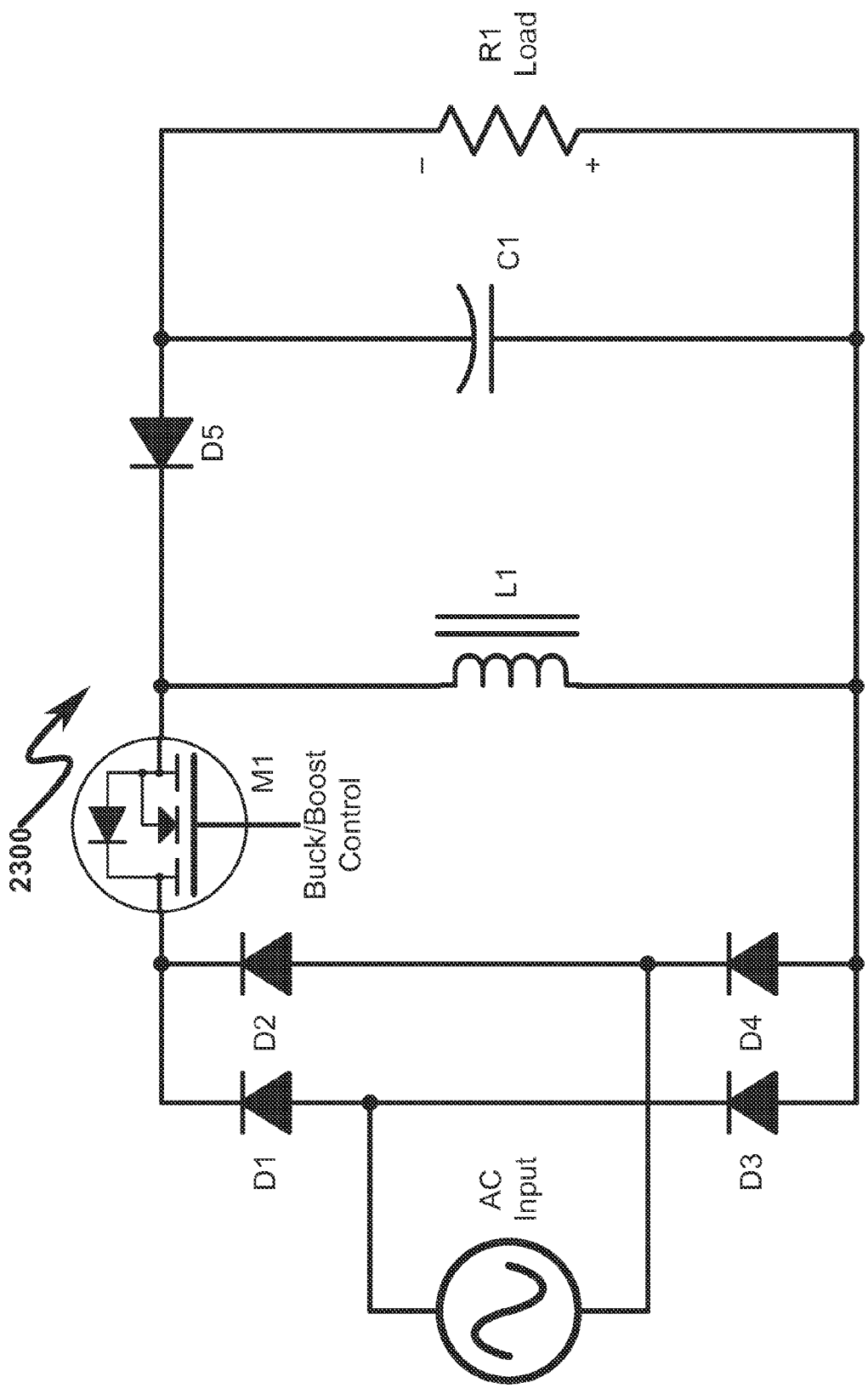
FIG. 23 illustrates a schematic of an exemplary inverting buck-boost converter useful in some preferred invention embodiments.
Figure 24:
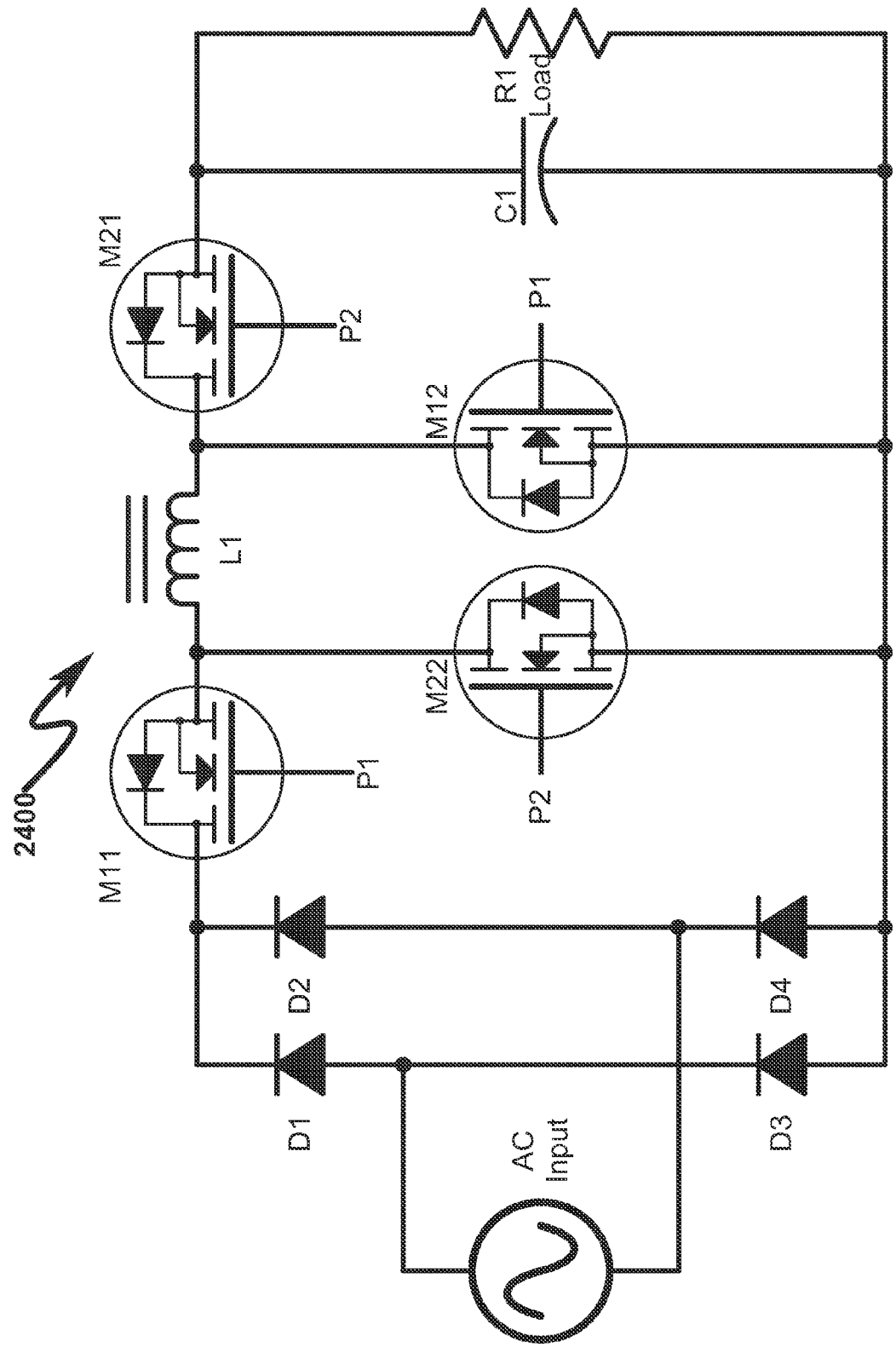
FIG. 24 illustrates a schematic of an exemplary non-inverting buck-boost converter useful in some preferred invention embodiments.

FIG. 17 (1700)-FIG. 24 (2400) depict various boost converter topologies which can be used as the boost converter (1251) within the context of the present invention. These various topologies can be designed to meet "power line disturbance" (meeting CBEMA curve) and AC waveform distortion (harmonics, voltage fluctuations, AC power line variations) requirements. The various topologies depicted include:

FIG. 17 (1700) illustrates a schematic of an exemplary PFC boost converter useful in some preferred invention embodiments. Boost converters as depicted in FIG. 17-FIG. 24 can provide Power Factor Correction (PFC) at the input stage, possess very low line harmonics, and provide close to unity power factor. Almost all AC-DC power supplies for IT equipment utilize boost converter topologies with active power factor correction;

FIG. 18 (1800) illustrates a schematic of an exemplary bridgeless boost converter useful in some preferred invention embodiments;

FIG. 19 (1900) illustrates a schematic of an exemplary single-phase PFC boost converter useful in some preferred invention embodiments;

FIG. 20 (2000) illustrates a schematic of an exemplary multi-state Vienna PFC boost converter useful in some preferred invention embodiments;

FIG. 21 (2100) illustrates a schematic of an exemplary interleaved bridgeless PFC boost converter useful in some preferred invention embodiments;

FIG. 22 (2200) illustrates a schematic of an exemplary multi-state bridgeless PFC boost converter useful in some preferred invention embodiments;

FIG. 23 (2300) illustrates a schematic of an exemplary inverting buck-boost converter useful in some preferred invention embodiments. Depending on the battery voltages utilized in the battery string, this topology may be effective in efficiently mating the battery string to the requirements of the DC-to-DC converter within the AC+DC power supply; and FIG. 24 (2400) illustrates a schematic of an exemplary non-inverting buck-boost converter useful in some preferred invention embodiments. This converter topology utilizes different phase controls (P1/P2) to determine the transfer characteristic of the converter.

One skilled in the art will recognize that other boost converter topologies may be used in this application and that these exemplary circuit topologies do not limit the scope of the claimed invention.

The various boost and buck-boost converters depicted in FIG. 17 (1700)-FIG. 24 (2400) may be combined with and/or integrated within the DC-DC converter portion of the AC+DC power supply to form an integrated conversion methodology that eliminates the traditional DC-to-AC conversion that is mandated by prior art UPS systems. This integration of components improves overall system efficiency while reducing component counts in the overall system architecture.

Hybrid System With Integrated Alternative Energy (2500)-2600)

Figure 25:
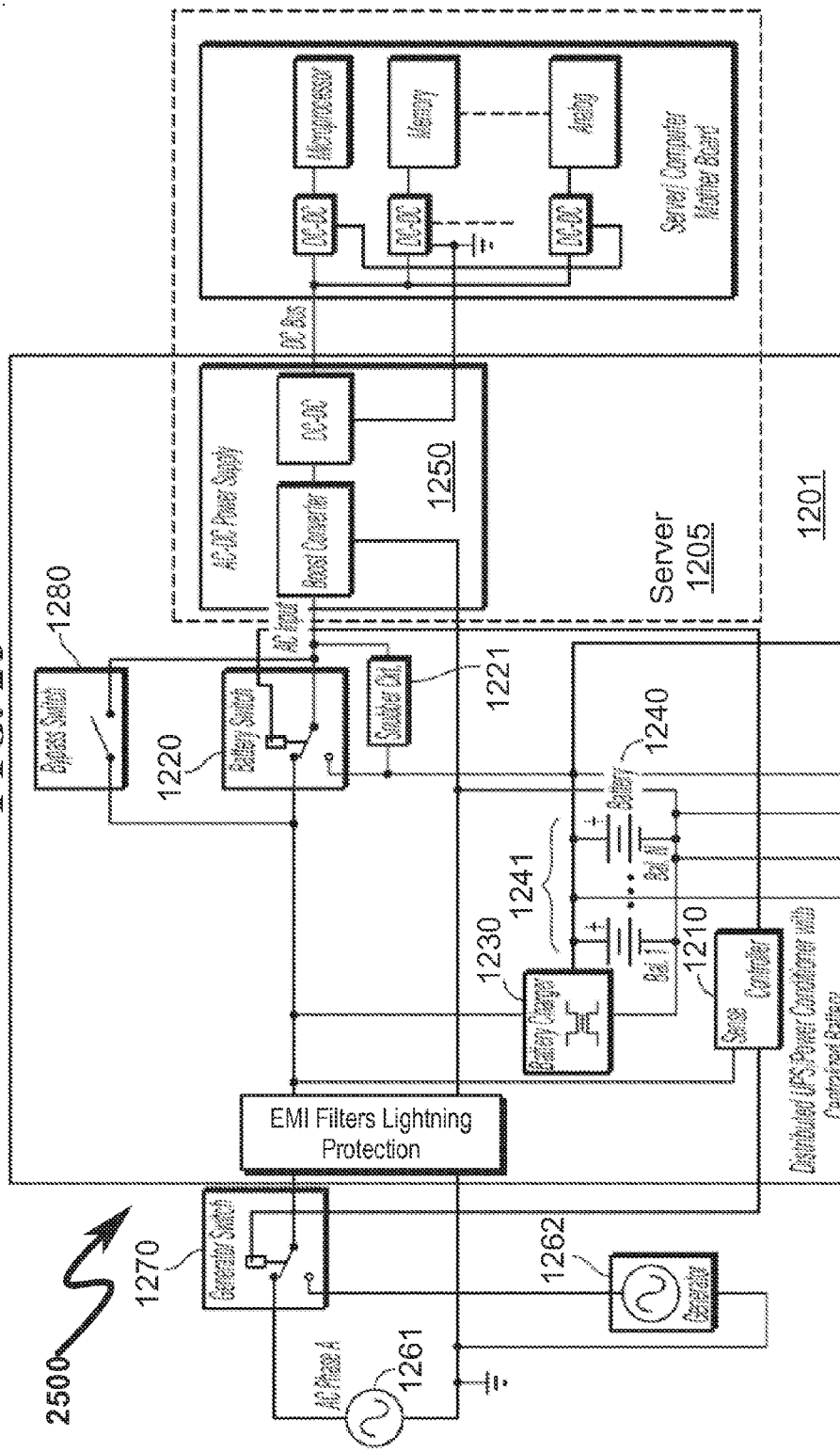
FIG. 25 and FIG. 26 illustrate a hybrid solution wherein the distributed UPS/power conditioner with centralized battery is integrated with alternative energy source. The distributed UPS/power conditioner battery can be integrated with one or multiple alternative sources such as solar panel, fuel cell, or flywheel. Different alternative sources can connect directly to the battery or through the battery charger. During power failure, DC battery or the alternative energy source can provide energy to the IT load.
Figure 26:
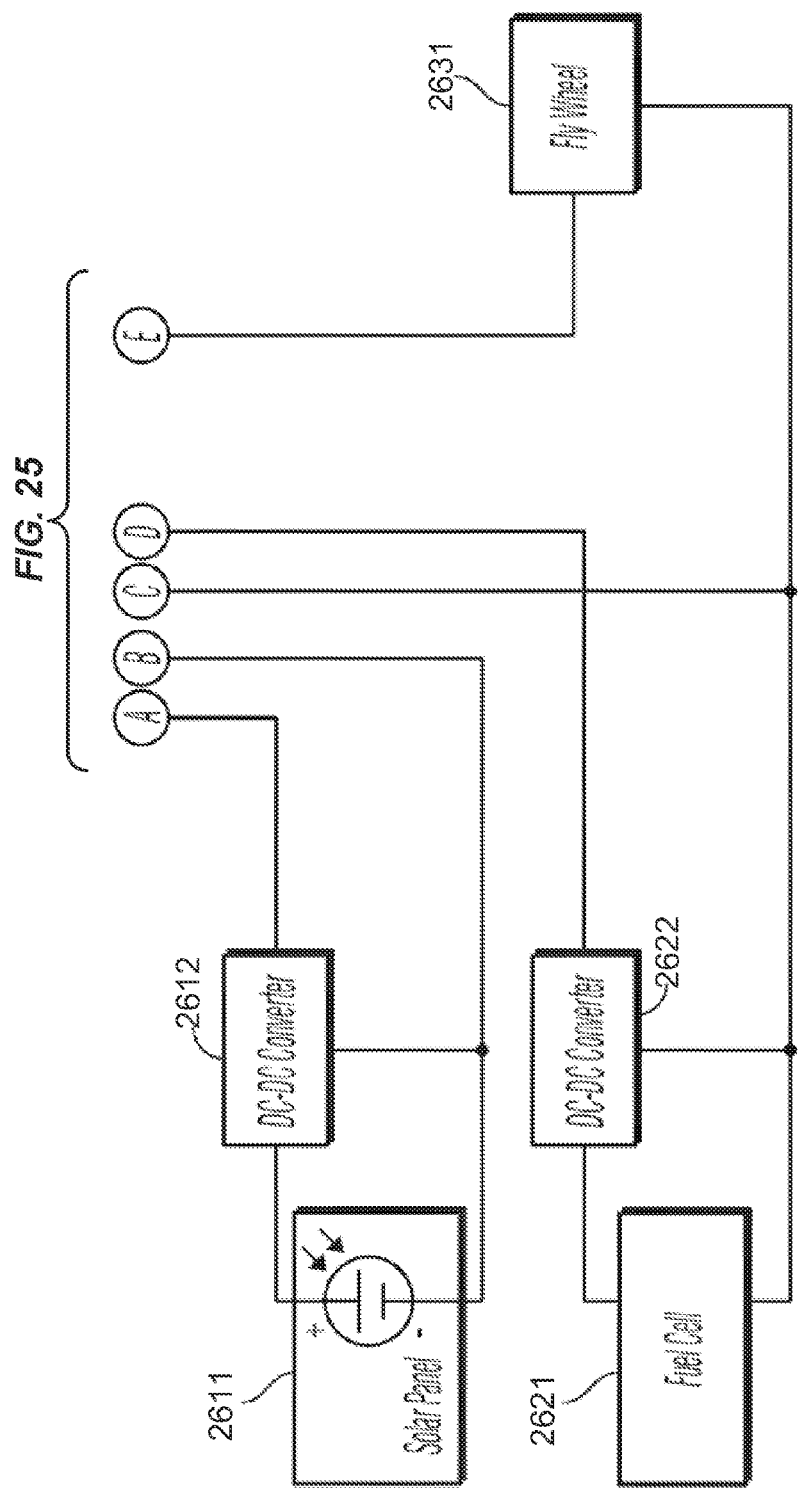

FIG. 25 (2500) and FIG. 26 (2600) depict a hybrid system integrated with alternative energy sources. The "distributed" uninterrupted power/power conditioner with centralized battery (1201) as shown in FIG. 25 (2500) can be integrated as depicted in FIG. 26 (2600) with solar panel (2611) and solar panel DC-DC converter (2612), fuel cell (2621), fuel cell DC-DC converter (2622), and flywheel (2631). All the alternative energy sources solar panel (2611), fuel cell (2621), and flywheel (2631) can store energy in battery strings (1240) via solar panel DC-DC converter (2612) and fuel cell DC-DC converter (2622). In the AC power failure/DC battery backup condition, solar panel (2611), fuel cell (2621), and flywheel (2631) will supply power to the server (1205) as well as charging the battery strings (1240). Alternatively, the battery strings (1240) can serve as the primary input power source when the server (1205) operates in DC input mode, with the battery transfer switch (1220) in battery mode connecting battery strings (1240) to the input of the server (1205). In this mode of operation, the generator transfer switch (1270) stays in utility mode, charging the battery strings (1240) via charger (1230), and the AC utility serves as a backup power source. When the battery string (1240) voltage drains below its specified voltage, the battery transfer switch (1220) will switch to utility mode and server (1205) will be powered by utility (1261).

Redundant Configurations—1+1 Redundancy (2700)-(2800)

Figure 27:
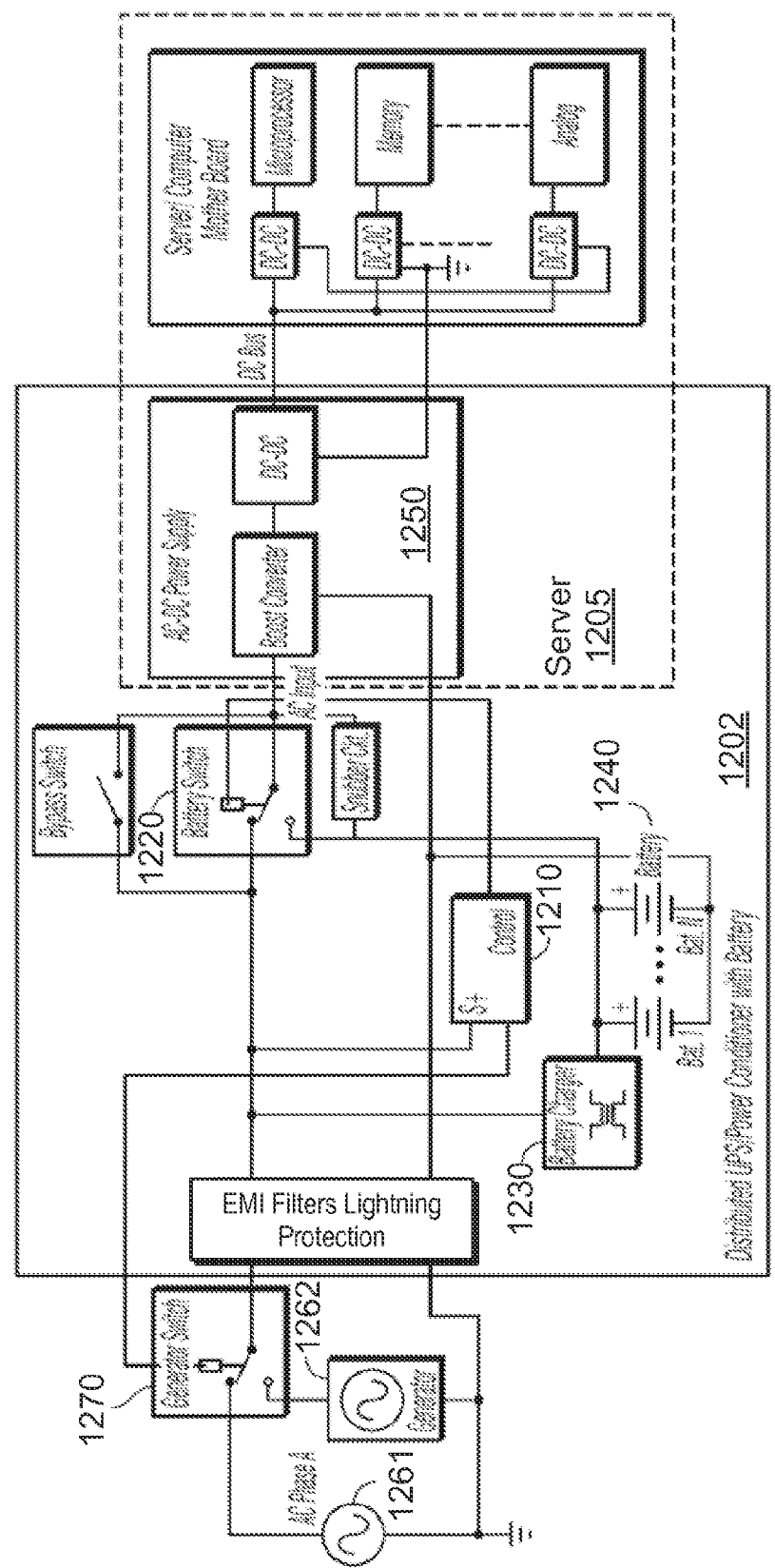
FIG. 27 and FIG. 28 illustrate two identical systems of FIG. 12, connected in parallel to provide the 1+1 server redundancy for the application. Two separate AC sources (AC phase 1A and AC phase 1B) power two independent servers (1205, 1206). In this configuration there will be a total of 2N battery strings in the system to provide backup power when AC fails.
Figure 28:
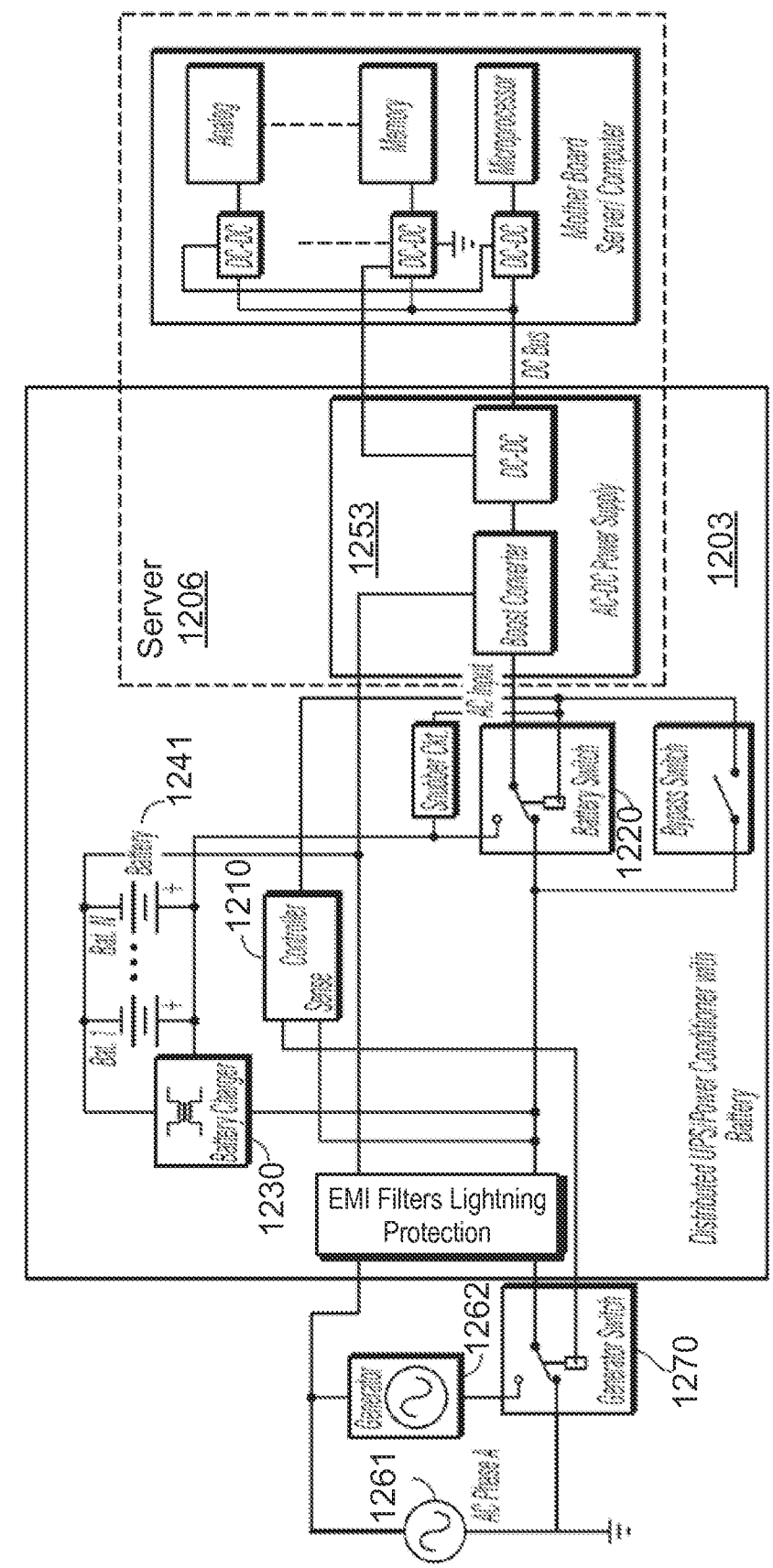

In FIG. 9 (0900)-FIG. 11 (1100), the rack (0940) may contain multiple servers to provide different computer processing needs. FIG. 27 (2700)-FIG. 28 (2800) depict a 1+1 redundant system configuration within rack (0940). In this configuration, the system of "distributed UPS/power conditioner with battery backup energy storage" (1202) and server (1205) is connected in parallel to an identical system consisting of "distributed UPS/power conditioner with battery backup energy storage" (1203) and server (1206). Battery strings (1240) contain N strings of batteries to provide backup power energy to server (1205) when the AC power utility (1261) falls out of its normal operation range (when a 120V nominal AC input voltage falls below a first threshold of 90V in any half cycle, or if the RMS voltage drops below a second cycle of 100V for a pre-specified time and conditions which may include but is not limited to brownouts, blackouts, voltage sag, surges, instabilities). Similarly, battery strings (1241) contain N strings of batteries and provide backup energy to the server (1206) when the AC utility power (1263) falls out of its normal operation range. The configuration of FIG. 27 (2700)-FIG. 28 (2800) contains a total of 2N strings of batteries to provide 1+1 redundant server backup power. Each "distributed UPS/power conditioner with battery backup energy storage" (1202, 1203) performs in the same mode of operation as its counterpart in FIG. 12 (1200). 1+1 Redundant Centralized Redundancy (2900)-(3000) FIG. 29 (2900)-FIG. 30 (3000) depict a 1+1 redundant system performing the same function as that of FIG. 27 (2700)-FIG. 28 (2800), but with a centralized battery system. The battery strings count is 1N instead of the 2N in FIG. 27 (2700)-FIG. 28 (2800). This system provides the same redundancy function as in the system of FIG. 27 (2700)-FIG. 28 (2800), but with 1N less battery, one less backup AC generator and one less controller. The battery strings (1240) get charged from both AC source (1261, 1263) via battery chargers (1230, 1231) in steady-state condition.

1+1 Redundant Centralized Redundancy Operation (3100)-(3200)

Figure 29:
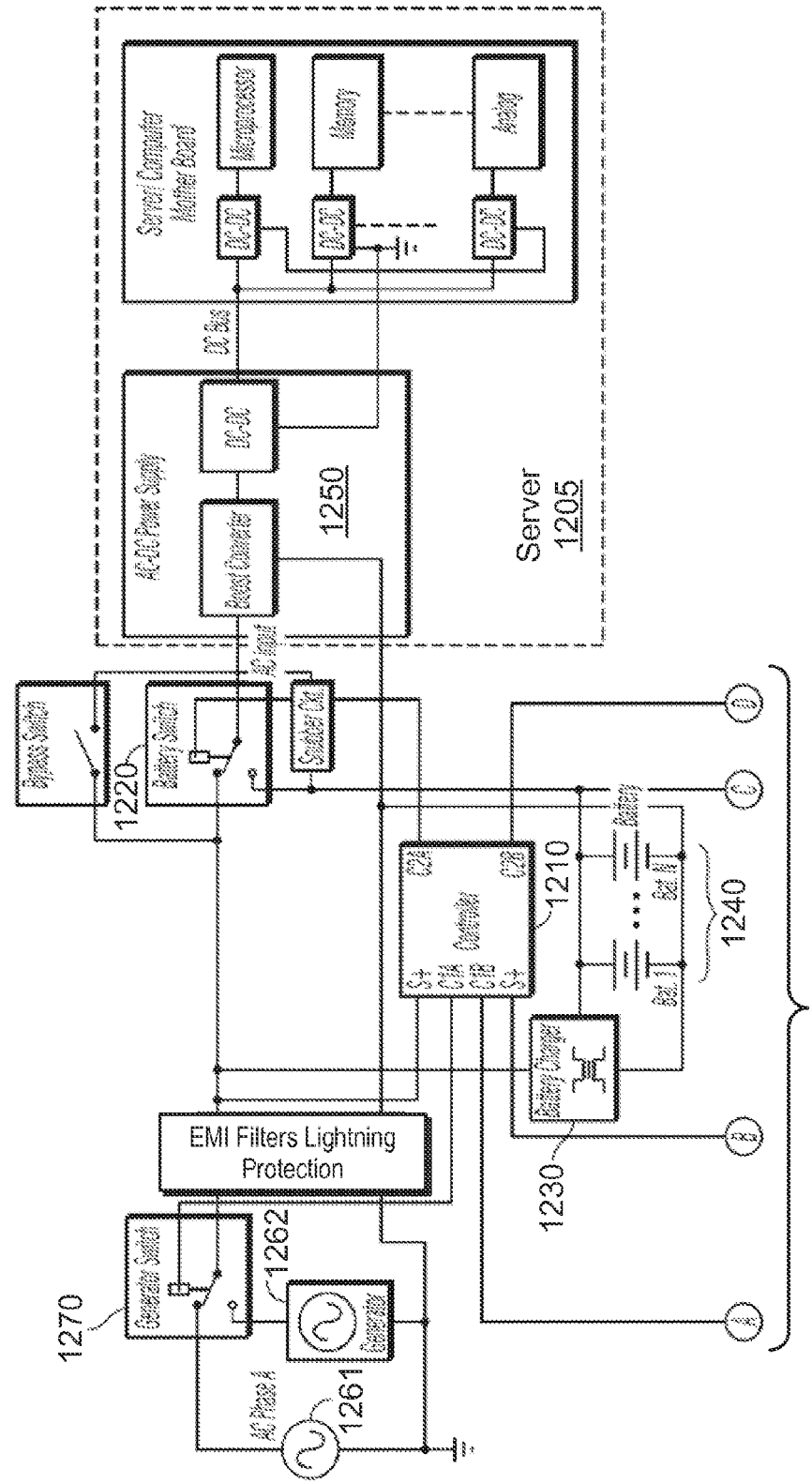
FIG. 29 and FIG. 30 illustrate a 1+1 redundant system performing the same function as the configuration of FIG. 5, but with a centralized battery system. The battery count is 1N instead of 2N (as in FIG. 27-28). This system provides the same redundancy function as that in FIG. 5, however it will have 1N less batteries, one less backup AC generator, and one less controller less than architecture in FIG. 27-28. The battery strings are charged from both AC sources (1261, 1263) via battery chargers (1230, 1231) in steady-state condition.
Figure 30:
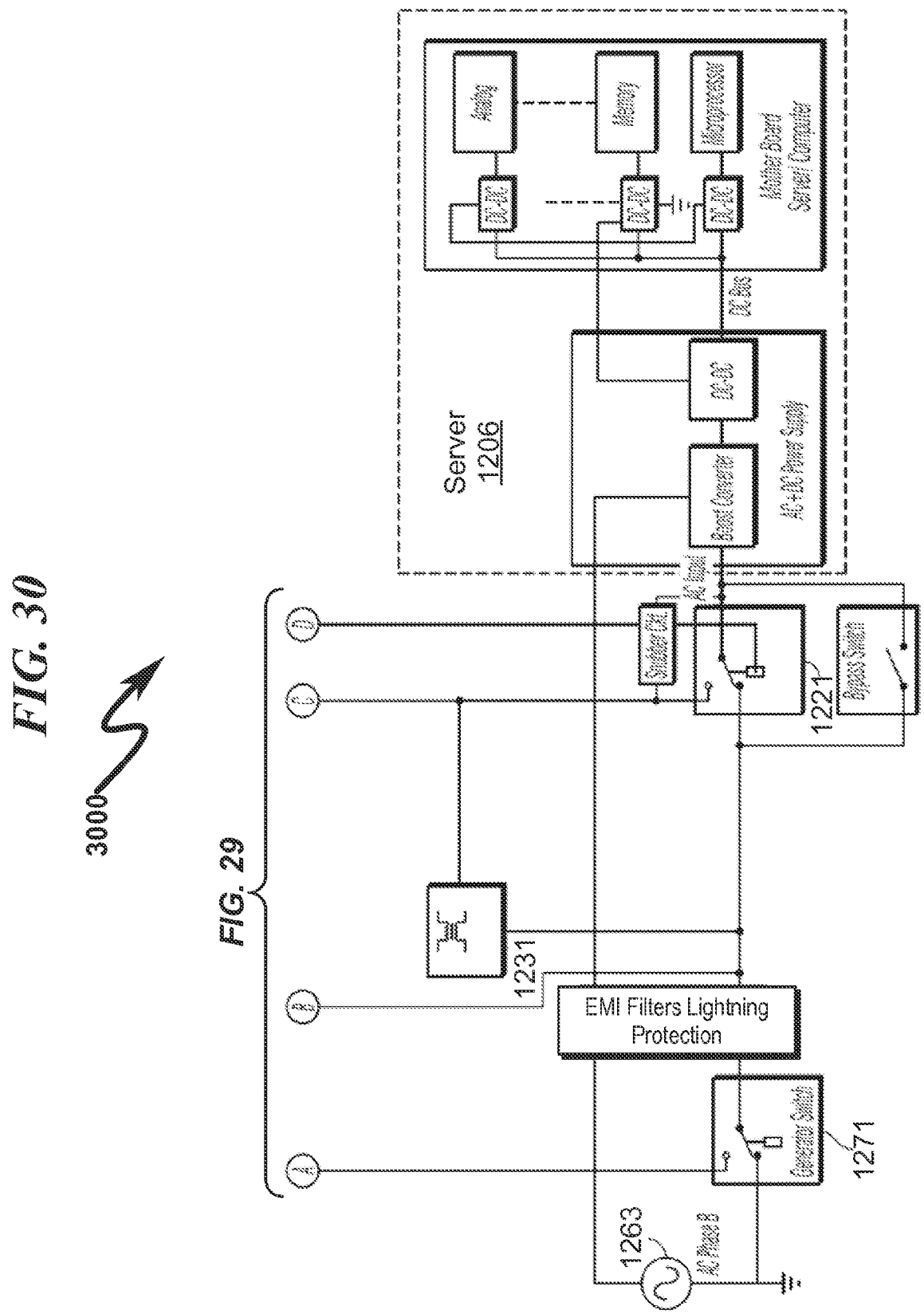
Figure 31:
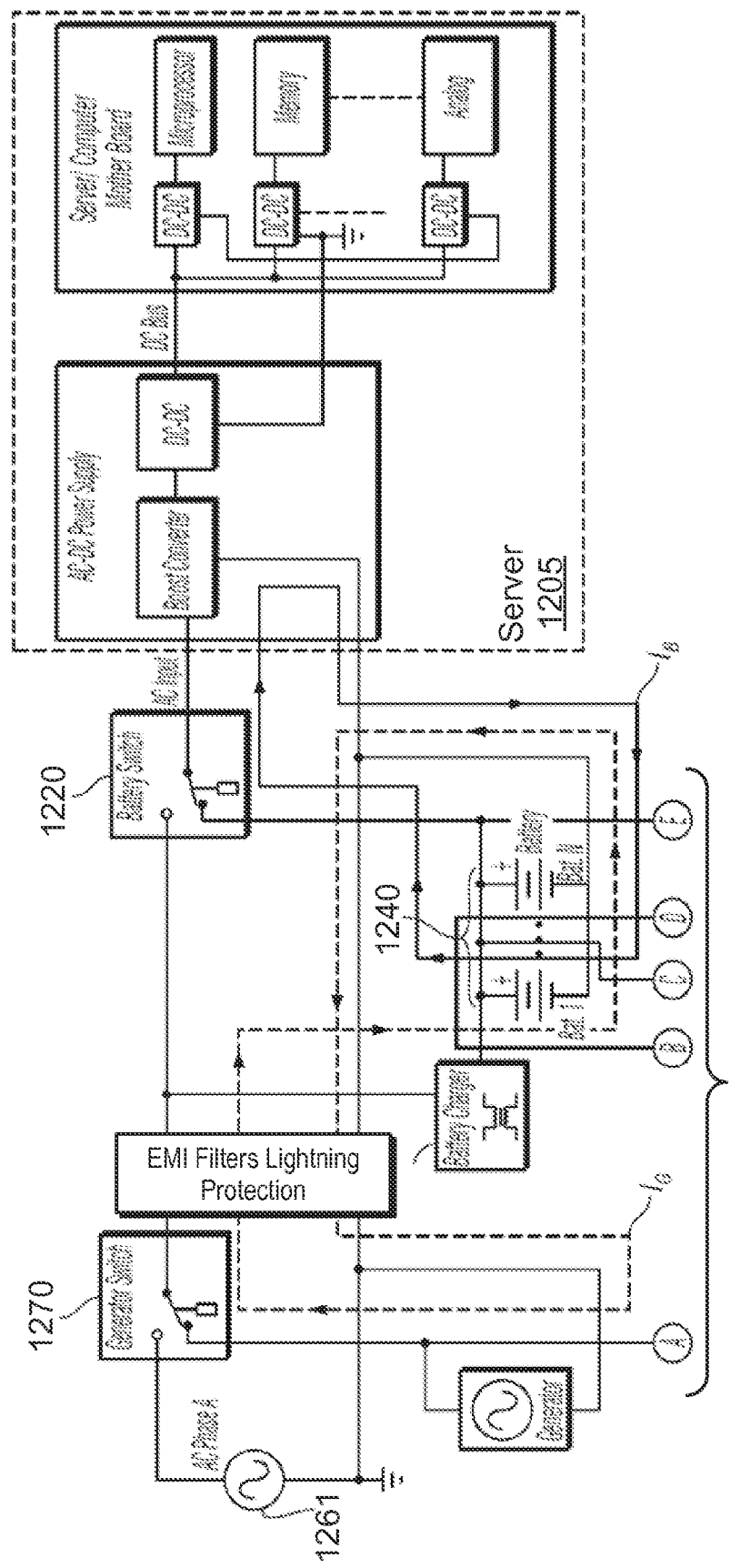

FIG. 31 (3100)-FIG. 32 (3200) depict the mode of operation of the "1+1 redundancy server with centralized battery" configuration of FIG. 29 (2900)-FIG. 30 (3000). Assume that the AC source (1261) loses power. When this happens, controller (1210) of FIG. 29 (2900)-FIG. 30 (3000) senses that the server (1205) input voltage is below its specified range and thereupon sends a command to the battery transfer switch (1220) to operate in DC-battery mode and break away from utility (1261). Battery strings (1240) therefore power the server (1205) via the current path Ib. Simultaneously, the controller (1210) instructs generator transfer switch (1270) to disconnect from failed AC source (1261) and connects to the backup generator (1262).

Battery strings (1240) are charged by battery charger (1230) (sourced by generator (1262)), via the current charge path Ig). Meanwhile, they are also charged by the battery charger (1231) (sourced by AC source (1263) phase B) via current path Ic. In this condition, battery strings (1240) provide power to the server (1205), being charged from two backup AC sources: backup generator (1262) and AC source B (1263).

The controller (1210) of FIG. 29 (2900)-FIG. 30 (3000) is deliberately omitted in FIG. 31 (3100)-FIG. 32 (3200) for sake of brevity and clarity in showing current paths.

Preferred Embodiment System Summary

The present invention preferred exemplary system embodiment anticipates a wide variety of variations in the basic theme of construction, but can be generalized as an uninterruptable power supply (UPS) system comprising:
  (a) power controller;
  (b) battery transfer switch;
  (c) battery charger;
  (d) battery string; and
  (e) AC+DC power supply;
  wherein
  the power controller further comprises a sense input and control output;
  the battery transfer switch further comprises a control input, common output, first switch input, and second switch input;
  the AC+DC power supply further comprises a power input and load output connections;
  the AC+DC power supply power input is electrically connected to the battery transfer switch common output;
  the battery transfer switch first switch input is electrically connected to the battery string;
  the battery transfer switch second switch input is electrically connected to a utility power source;
  the power controller sense input is electrically connected to the utility power source;
  the power controller control output is electrically connected to the battery transfer switch control input;
  the power controller control output is configured to activate the battery transfer switch to electrically connect the utility power source to the AC+DC power supply power input when power from the utility power source is available and electrically connects the battery string to the AC+DC power supply power input when power from the utility power source is not available;
  the battery charger further comprises a utility power input, generator input, and load output that are electrically isolated;
  the battery charger power input is electrically connected to the utility power source;
  the battery charger generator input is electrically connected to an alternate power source;
  the battery charger load output is electrically connected to the battery string; and the battery charger charges the battery string in response to electrical power received from the utility power source or the alternate power source.

This general system summary may be augmented by the various elements described herein to produce a wide variety of invention embodiments consistent with this overall design description.

Preferred Embodiment Method Summary

The present invention preferred exemplary method embodiment anticipates a wide variety of variations in the basic theme of implementation, but can be generalized as an uninterruptable power supply method, the method operating in conjunction with an uninterruptable power supply system comprising:
(a) power controller;
(b) battery transfer switch;
(c) battery charger;
(d) battery string; and
(e) AC+DC power supply;
wherein
the power controller further comprises a sense input and control output;
the battery transfer switch further comprises a control input, common output, first switch input, and second switch input;
the AC+DC power supply further comprises a power input and load output connections;
the AC+DC power supply power input is electrically connected to the battery transfer switch common output;
the battery transfer switch first switch input is electrically connected to the battery string;
the battery transfer switch second switch input is electrically connected to a utility power source;
the power controller sense input is electrically connected to the utility power source;
the power controller control output is electrically connected to the battery transfer switch control input;
the power controller control output is configured to activate the battery transfer switch to electrically connect the utility power source to the AC+DC power supply power input when power from the utility power source is available and electrically connects the battery string to the AC+DC power supply power input when power from the utility power source is not available;
the battery charger further comprises a utility power input, generator input, and load output that are electrically isolated;
the battery charger power input is electrically connected to the utility power source;
the battery charger generator input is electrically connected to an alternate power source;
the battery charger load output is electrically connected to the battery string; and
the battery charger charges the battery string in response to electrical power received from the utility power source or the alternate power source.
wherein the method comprises the steps of:
(1) monitoring the utility power source with the power controller;
(2) activating the battery transfer switch to connect the utility power source to the AC+DC power supply if the utility power source is currently providing power;
(3) activating the battery transfer switch to connect the battery string to the AC+DC power supply if the utility power source is not currently providing power; and
(4) charging the battery string with the battery charger, with power for the battery charger being derived from the utility power source or an alternate power source.

One skilled in the art will recognize that these method steps may be augmented or rearranged without limiting the teachings of the present invention. This general method summary may be augmented by the various elements described herein to produce a wide variety of invention embodiments consistent with this overall design description.

The method steps depicted in this preferred embodiment are derived from FIG. 4 (0400). However, these steps can be augmented using alternative methodologies as depicted in FIG. 6 (0600) and FIG. 8 (0800) with no loss in the teachings of the present invention.

Alternate Preferred Embodiment System Summary

The present invention may be embodied in many preferred alternate forms, some of which may incorporate the following structures:
A distributed uninterrupted power/power conditioner with centralized battery system for data centers comprising the following elements:
AC-DC Power Supply. An AC-DC power supply which can work in either AC or DC input mode with the same input connector. In the AC mode of operation, AC input voltage range is 85 Vrms-265 Vrms, 40-75 Hz, or DC input range from 85 VDC×$\sqrt{2}$-265 VDC× $\sqrt{2}$2=374 VDC. In DC mode of operation, the power supply can design to meet any DC input voltage range as long as it is operational with an AC input voltage range 85 Vrms-265 Vrms, 40-75 Hz. This power supply has two internal power conversion stages: (1) the first stage is a boost converter which provides active power factor correction and (2) the second stage is a DC-DC converter which converts the boost output to a lower DC voltage bus of 10 to 14 VDC either regulated or semi-regulated (±10% of its rated voltage), to the IT load. The power supply being designed to meet CBEMA curve and AC wave form distortion requirements (harmonics, voltage fluctuation, AC power frequency variations) in order to provide for power conditioning.
Battery Transfer Switch. A battery transfer switch that can connect from either the AC utility source or the DC battery source to the power supply specified above. In normal operation, this battery transfer switch connects the AC utility source to the power supply input, when the AC utility fails, the battery transfer switch connects the DC battery to the power supply while breaking away from the AC source. The transfer switch may follow the command sent by the controller stated below.
Controller. This controller monitors the quality of the utility input power. During utility outages, the controller instructs the battery transfer switch to connect to the backup battery while disconnecting from the failed utility. It also instructs the backup generator transfer switch to connect to the backup generator, hence providing backup power function for the data center. When utility power goes back to normal, the controller will instruct transfer switches to connect to utility mode.

Isolated Battery Charger. The battery charger located between utility and battery strings will charge the battery strings during normal AC operation. When AC power fails, it will continue charge to the battery string from the backup generator. The isolation required for the battery charger is for safety concerns: it will provide isolation between the utility and the battery when the battery charger fails.

Battery Strings. These get charged during normal AC utility condition. They will discharge and provide power to the data center's power supply as specified above, thus ensuring uninterruptable power supply to the IT load when utility fails.

Surge Protection. EMI/Lightning circuitry serves lighting/line surge protection as well as noise suppression function/power conditioner features.

The architecture of the system as described above wherein: in a 1+1, N+1, N+2 . . . N+N redundancy system, battery strings are centralized therefore reducing the battery count while maintaining system redundancy objectives.

The architecture of the system as described above wherein: this architecture is capable of accommodating an IT load comprising of microprocessors, storage devices, hard disks, and memory or any combination thereof.

The architecture of the system as described above wherein: the snubber circuitry across the battery transfer switch serves as an energy absorber. When the battery transfer switch breaks away from DC mode back to utility mode, the snubber circuit can suppress the voltage arc across the transfer switch.

The architecture of the system as described above wherein there is a bypass switch across the battery transfer switch. This static switch can be either a mechanical or electrical device. The static switch serves two functions: (1) it can bypass the battery transfer switch when the battery transfer switch and battery are subject to maintenance or testing, and (2) it can act as a redundant battery transfer switch upon when transfer switch failure, thus increasing system reliability.

The architecture of the system as described above wherein the AC input voltage is connected in WYE configuration.

The architecture of the system as described above wherein the AC input voltage is in DELTA configuration The architecture of the system as described above wherein: the AC input voltage is a single-phase line to phase voltage configured from a three-phase system.

The architecture of the system as described above wherein the AC input voltage other than that specified can be 85 Vrms to 480 Vrms. The DC battery voltage can be any voltage not exceeding 480×√2=678 VDC.

The architecture of the system as described above wherein the AC input voltage other than that specified input voltage is a sinusoidal waveform with frequency between 45 Hz to 500 Hz.

The architecture of the system as described above wherein the system can be integrated with alternative energy source: solar panel, fuel cell, flywheel, and other alternative energy source.

The architecture of the system as described above wherein the battery strings can be selected from a chemical group selected from: lead acid; lithium iron; nickel cadmium; sodium sulfur; vanadium redox; nickel cadmium; and alkaline.

The architecture of the system as described above wherein the AC-DC power supply will be used as a DC-DC power supply when the system in DC-Battery backup mode.

The architecture of the system as described above wherein the AC-DC power supply will be operated either AC-mode or DC mode, either mode will operate from the same input connection of AC-DC power supply.

The architecture of the system as described above wherein the battery strings can be designed as a centralized system shared by all the distributed system, or battery strings can be designed as distributed system along with each power supply.

The architecture of the system as described above wherein the battery charger charges the central battery strings that can be charged from multiple AC sources during normal operating condition. In the event of power failures, the battery strings can be charged from another connected AC source as well as backup generator, which serves a redundant, uninterrupted power source to the battery strings and the load.

System/Method Variations

The present invention anticipates a wide variety of variations in the basic theme of construction. The examples presented previously do not represent the entire scope of possible usages. They are meant to cite a few of the almost limitless possibilities.

This basic system and method may be augmented with a variety of ancillary embodiments, including but not limited to:

An embodiment wherein the utility power source comprises a three-phase DELTA power source.

An embodiment wherein the utility power source comprises a three-phase WYE power source.

An embodiment wherein the load output is electrically connected to a computing device.

An embodiment wherein the load output is electrically connected to a networked computing server.

An embodiment wherein the battery transfer switch further comprises snubber circuitry configured as an energy absorber.

An embodiment wherein the battery transfer switch further comprises a bypass switch.

An embodiment wherein the input voltage to the AC+DC power supply is a single-phase line to phase voltage configured from a three-phase power system.

An embodiment wherein the system further comprises an energy source selected from a group consisting of: solar panel; fuel cell; flywheel; and alternative energy source.

An embodiment wherein the battery string is selected from a chemical group consisting of: lead acid; lithium iron; nickel cadmium; sodium sulfur; vanadium redox; nickel cadmium; and alkaline.

One skilled in the art will recognize that other embodiments are possible based on combinations of elements taught within the above invention description.

Generalized Computer Usable Medium

In various alternate embodiments, the present invention may be implemented as a computer program product for use with a computerized computing system. Those skilled in the art will readily appreciate that programs defining the functions defined by the present invention can be written in any appropriate programming language and delivered to a computer in many forms, including but not limited to: (a) information permanently stored on non-writeable storage media (e.g., read-only memory devices such as ROMs or CD-ROM disks); (b) information alterably stored on writeable storage media (e.g., floppy disks and hard drives); and/or (c) information conveyed to a computer through communication media, such as a local area network, a telephone network, or a public network such as the Internet. When carrying computer readable instructions that implement the present invention methods, such computer readable media represent alternate embodiments of the present invention.

As generally illustrated herein, the present invention system embodiments can incorporate a variety of computer readable media that comprise computer usable medium having computer readable code means embodied therein. One skilled in the art will recognize that the software associated with the various processes described herein can be embodied in a wide variety of computer accessible media from which the software is loaded and activated. Pursuant to In re Beauregard, 35 USPQ2d 1383 (U.S. Pat. No. 5,710,578), the present invention anticipates and includes this type of computer readable media within the scope of the invention. Pursuant to In re Nuijten, 500 F.3d 1346 (Fed. Cir. 2007) (U.S. patent application Ser. No. 09,211,928), the present invention scope is limited to computer readable media wherein the media is both tangible and non-transitory.

Conclusion

An uninterruptable power supply (UPS) system/method providing power line conditioning and power factor correction (PFC) that incorporates centralized battery backup energy storage architecture has been disclosed. The system generally comprises an AC-DC power supply with active PFC (power factor correction) function, a battery transfer switch, an isolated battery charger placed between the utility power source and battery strings, battery strings connecting the battery charger and the battery transfer switch, EMI/Lightning circuitry that provides lighting/line surge protection as well noise suppression functions, and a controller monitoring the quality of the utility power source. Uninterruptable power for data centers is achieved in this context via use of the battery strings, battery transfer switch, battery charger, and controller system configuration. Disclosed methods associated with this system generally permit the UPS to operate in a distributed fashion in support of computing systems within data centers.

What is claimed is:
1. An uninterruptable power supply system comprising:
(a) power controller;
(b) battery transfer switch;
(c) battery charger;
(d) battery string; and
(e) AC+DC power supply;
wherein:
said power controller further comprises a sense input and control output;
said battery transfer switch further comprises a control input, common output, first switch input, and second switch input;
said AC+DC power supply further comprises a power input and load output connections;
said AC+DC power supply power input is electrically connected to said battery transfer switch common output;

said battery transfer switch first switch input is electrically connected to said battery string;
said battery transfer switch second switch input is electrically connected to a utility power source;
said power controller sense input is electrically connected to said utility power source;
said power controller control output is electrically connected to said battery transfer switch control input;
said power controller control output is configured to activate said battery transfer switch to electrically connect said utility power source to said AC+DC power supply power input when power from said utility power source is available and electrically connects said battery string to said AC+DC power supply power input when power from said utility power source is not available;
said battery charger further comprises a power input and load output that are electrically isolated;
said battery charger power input is electrically connected to said utility power source;
said battery charger load output is electrically connected to said battery string; and
said battery charger charges said battery string in response to electrical power received from said utility power source or an alternate power source.

2. The uninterruptable power supply system of claim 1 wherein said utility power source comprises a three-phase DELTA power source.

3. The uninterruptable power supply system of claim 1 wherein said utility power source comprises a three-phase WYE power source.

4. The uninterruptable power supply system of claim 1 wherein said load output is electrically connected to a computing device.

5. The uninterruptable power supply system of claim 1 wherein said load output is electrically connected to a networked computing server.

6. The uninterruptable power supply system of claim 1 wherein said battery transfer switch further comprises snubber circuitry configured as an energy absorber.

7. The uninterruptable power supply system of claim 1 wherein said battery transfer switch further comprises a bypass switch.

8. The uninterruptable power supply system of claim 1 wherein the input voltage to said AC+DC power supply is a single-phase line to phase voltage configured from a three-phase power system.

9. The uninterruptable power supply system of claim 1 wherein said system further comprises an energy source selected from a group consisting of: solar panel; fuel cell; flywheel; and alternative energy source.

10. The uninterruptable power supply system of claim 1 wherein said battery string is selected from a chemical group consisting of: lead acid; lithium iron; nickel cadmium; sodium sulfur; vanadium redox; nickel cadmium; and alkaline.

11. An uninterruptable power supply method, said method operating in conjunction with an uninterruptable power supply system, said system comprising:
(a) power controller;
(b) battery transfer switch;
(c) battery charger;
(d) battery string; and
(e) AC+DC power supply;
wherein:
said power controller further comprises a sense input and control output;

said battery transfer switch further comprises a control input, common output, first switch input, and second switch input;

said AC+DC power supply further comprises a power input and load output connections;

said AC+DC power supply power input is electrically connected to said battery transfer switch common output;

said battery transfer switch first switch input is electrically connected to said battery string;

said battery transfer switch second switch input is electrically connected to a utility power source;

said power controller sense input is electrically connected to said utility power source;

said power controller control output is electrically connected to said battery transfer switch control input;

said power controller control output is configured to activate said battery transfer switch to electrically connect said utility power source to said AC+DC power supply power input when power from said utility power source is available and electrically connects said battery string to said AC+DC power supply power input when power from said utility power source is not available;

said battery charger further comprises a power input and load output that are electrically isolated;

said battery charger power input is electrically connected to said utility power source;

said battery charger load output is electrically connected to said battery string; and said battery charger charges said battery string in response to electrical power received from said utility power source or an alternate power source;

wherein said method comprises the steps of:

(1) monitoring said utility power source with said power controller;

(2) activating said battery transfer switch to connect said utility power source to said AC+DC power supply if said utility power source is currently providing power;

(3) activating said battery transfer switch to connect said battery string to said AC+DC power supply if said utility power source is not currently providing power; and (4) charging said battery string with said battery charger, with power for said battery charger being derived from said utility power source or said alternate power source.

12. The uninterruptable power supply method of claim 11 wherein said utility power source comprises a three-phase DELTA power source.

13. The uninterruptable power supply method of claim 11 wherein said utility power source comprises a three-phase WYE power source.

14. The uninterruptable power supply method of claim 11 wherein said load output is electrically connected to a computing device.

15. The uninterruptable power supply method of claim 11 wherein said load output is electrically connected to a networked computing server.

16. The uninterruptable power supply method of claim 11 wherein said battery transfer switch further comprises snubber circuitry configured as an energy absorber.

17. The uninterruptable power supply method of claim 11 wherein said battery transfer switch further comprises a bypass switch.

18. The uninterruptable power supply method of claim 11 wherein the input voltage to said AC+DC power supply is a single-phase line to phase voltage configured from a three-phase power system.

19. The uninterruptable power supply method of claim 11 wherein said system further comprises an energy source selected from a group consisting of: solar panel; fuel cell; flywheel; and alternative energy source.

20. The uninterruptable power supply method claim 11 wherein said battery string is selected from a chemical group consisting of: lead acid; lithium iron; nickel cadmium; sodium sulfur; vanadium redox; nickel cadmium; and alkaline.

21. A tangible non-transitory computer usable medium having computer-readable program code means comprising an uninterruptable power supply (UPS) method, said method operating in conjunction with an uninterruptable power supply system, said system comprising:

(a) power controller;
(b) battery transfer switch;
(c) battery charger;
(d) battery string; and
(e) AC+DC power supply;

wherein said power controller further comprises a sense input and control output;

said battery transfer switch further comprises a control input, common output, first switch input, and second switch input;

said AC+DC power supply further comprises a power input and load output connections;

said AC+DC power supply power input is electrically connected to said battery transfer switch common output;

said battery transfer switch first switch input is electrically connected to said battery string;

said battery transfer switch second switch input is electrically connected to a utility power source;

said power controller sense input is electrically connected to said utility power source;

said power controller control output is electrically connected to said battery transfer switch control input;

said power controller control output is configured to activate said battery transfer switch to electrically connect said utility power source to said AC+DC power supply power input when power from said utility power source is available and electrically connects said battery string to said AC+DC power supply power input when power from said utility power source is not available;

said battery charger further comprises a power input and load output that are electrically isolated;

said battery charger power input is electrically connected to said utility power source;

said battery charger load output is electrically connected to said battery string; and said battery charger charges said battery string in response to electrical power received from said utility power source or an alternate power source;

wherein said method comprises the steps of:

(1) monitoring said utility power source with said power controller;

(2) activating said battery transfer switch to connect said utility power source to said AC+DC power supply if said utility power source is currently providing power;

(3) activating said battery transfer switch to connect said battery string to said AC+DC power supply if said utility power source is not currently providing power; and (4) charging said battery string with said battery charger, with power for said battery charger being derived from said utility power source or said alternate power source.

22. The computer usable medium of claim 21 wherein said utility power source comprises a three-phase DELTA power source.

23. The computer usable medium of claim 21 wherein said utility power source comprises a three-phase WYE power source.

24. The computer usable medium of claim 21 wherein said load output is electrically connected to a computing device.

25. The computer usable medium of claim 21 wherein said load output is electrically connected to a networked computing server.

26. The computer usable medium of claim 21 wherein said battery transfer switch further comprises snubber circuitry configured as an energy absorber.

27. The computer usable medium of claim 21 wherein said battery transfer switch further comprises a bypass switch.

28. The computer usable medium of claim 21 wherein the input voltage to said AC+DC power supply is a single-phase line to phase voltage configured from a three-phase power system.

29. The computer usable medium of claim 21 wherein said system further comprises an energy source selected from a group consisting of: solar panel; fuel cell; flywheel; and alternative energy source.

30. The computer usable medium of claim 21 wherein said battery string is selected from a chemical group consisting of: lead acid; lithium iron; nickel cadmium; sodium sulfur; vanadium redox; nickel cadmium; and alkaline.

* * * * *